(12) United States Patent
Park et al.

(10) Patent No.: US 7,352,764 B1
(45) Date of Patent: Apr. 1, 2008

(54) CONTENT ADDRESSABLE MERGED QUEUE ARCHITECTURE FOR SWITCHING DATA

(75) Inventors: Sung Soo Park, Cupertino, CA (US); Sung Man Park, Kyungkido (KR); Jung Wook Cho, Sunnyvale, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 777 days.

(21) Appl. No.: 10/762,950

(22) Filed: Jan. 21, 2004

Related U.S. Application Data

(63) Continuation-in-part of application No. 10/645,786, filed on Aug. 20, 2003, and a continuation-in-part of application No. 10/434,785, filed on May 8, 2003.

(51) Int. Cl.
*H04L 12/28* (2006.01)

(52) U.S. Cl. ............... 370/412; 370/389; 711/108; 365/49

(58) Field of Classification Search ............ None
See application file for complete search history.

(56) References Cited

U.S. PATENT DOCUMENTS

| | | | |
|---|---|---|---|
| 5,260,935 A | 11/1993 | Turner | |
| 5,339,311 A | 8/1994 | Turner | |
| 5,390,173 A | 2/1995 | Spinney et al. | |
| 5,414,704 A | 5/1995 | Spinney | |
| 5,640,534 A * | 6/1997 | Liu et al. ............... | 711/146 |
| 5,896,380 A | 4/1999 | Brown et al. | |
| 5,923,644 A | 7/1999 | McKeown et al. | |
| 5,949,789 A | 9/1999 | Davis et al. | |
| 6,081,507 A | 6/2000 | Chao et al. | |
| 6,292,491 B1 | 9/2001 | Sharper | |
| 6,324,164 B1 | 11/2001 | Luijten et al. | |
| 6,370,144 B1 | 4/2002 | Chao et al. | |
| 6,389,031 B1 | 5/2002 | Chao et al. | |
| 6,487,213 B1 * | 11/2002 | Chao ............... | 370/418 |
| 6,567,417 B2 | 5/2003 | Kalkunte et al. | |
| 6,594,270 B1 | 7/2003 | Drummond-Murray et al. | |
| 6,609,222 B1 * | 8/2003 | Gupta et al. ............ | 714/733 |
| 6,625,121 B1 | 9/2003 | Lau et al. | |
| 6,647,428 B1 | 11/2003 | Bannai et al. | |
| 6,674,720 B1 | 1/2004 | Passint et al. | |
| 6,747,971 B1 | 6/2004 | Hughes et al. | |
| 6,816,492 B1 | 11/2004 | Turner et al. | |
| 6,856,622 B1 | 2/2005 | Calamvokis et al. | |
| 6,876,653 B2 | 4/2005 | Ambe et al. | |
| 6,907,041 B1 | 6/2005 | Turner et al. | |
| 6,975,638 B1 | 12/2005 | Chen et al. | |
| 7,000,026 B2 | 2/2006 | Beshai et al. | |
| 7,046,687 B1 * | 5/2006 | Brown et al. ............ | 370/412 |
| 7,092,390 B2 | 8/2006 | Wan | |
| 2002/0085567 A1 | 7/2002 | Ku et al. | |
| 2004/0030766 A1 | 2/2004 | Witkowski | |
| 2006/0007871 A1 | 1/2006 | Welin | |

* cited by examiner

*Primary Examiner*—Duc Ho
(74) *Attorney, Agent, or Firm*—Blakely Sokoloff Taylor & Zafman

(57) ABSTRACT

A content addressable merged queue (camQ) architecture for switching data. The camQ architecture comprises a first array of priority cells for indicating a priority of a plurality of cells and a second array of destination cells for indicating a destination of the plurality of cells. A priority selector is operable to select a portion of said plurality of cells according to a priority selection. A grant generator is operable to grant at least one connection request associated with cells of the portion.

29 Claims, 17 Drawing Sheets

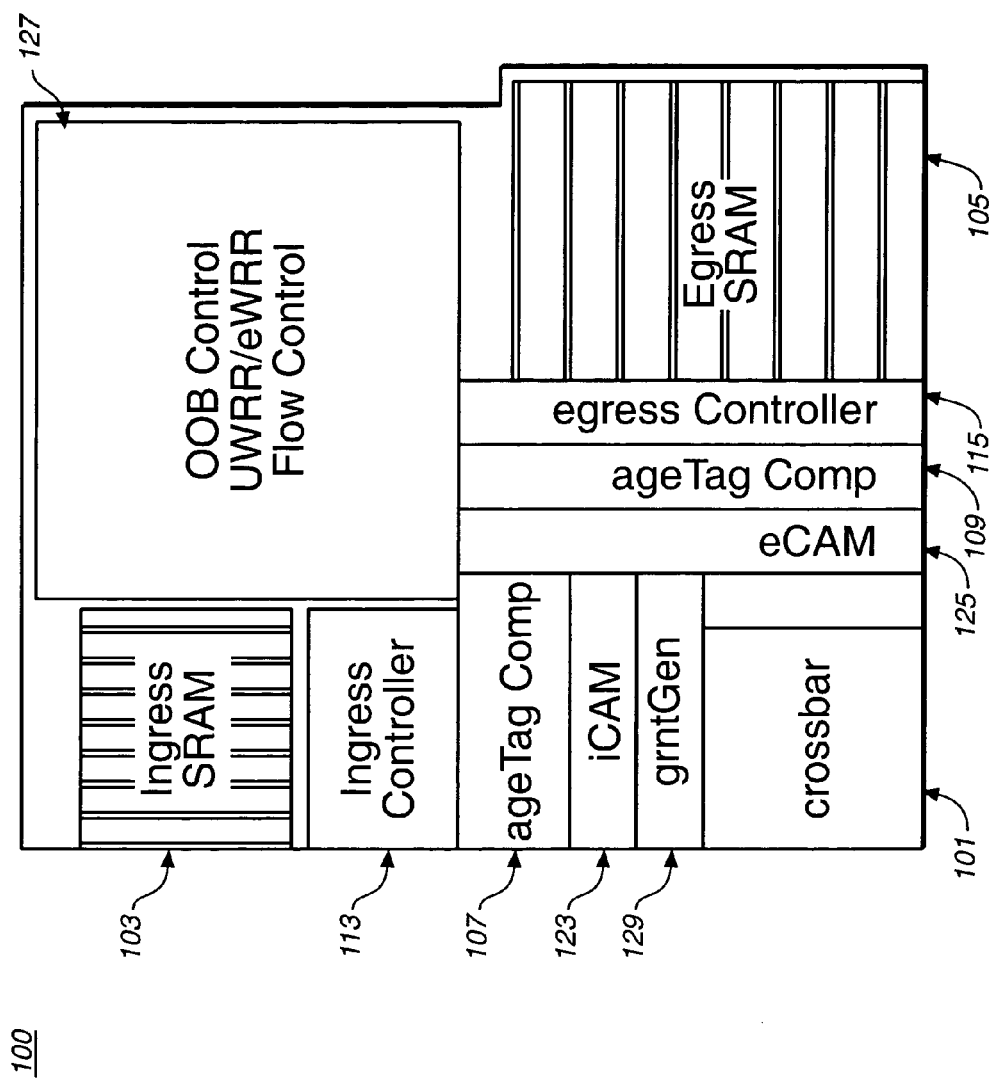
FIG._1

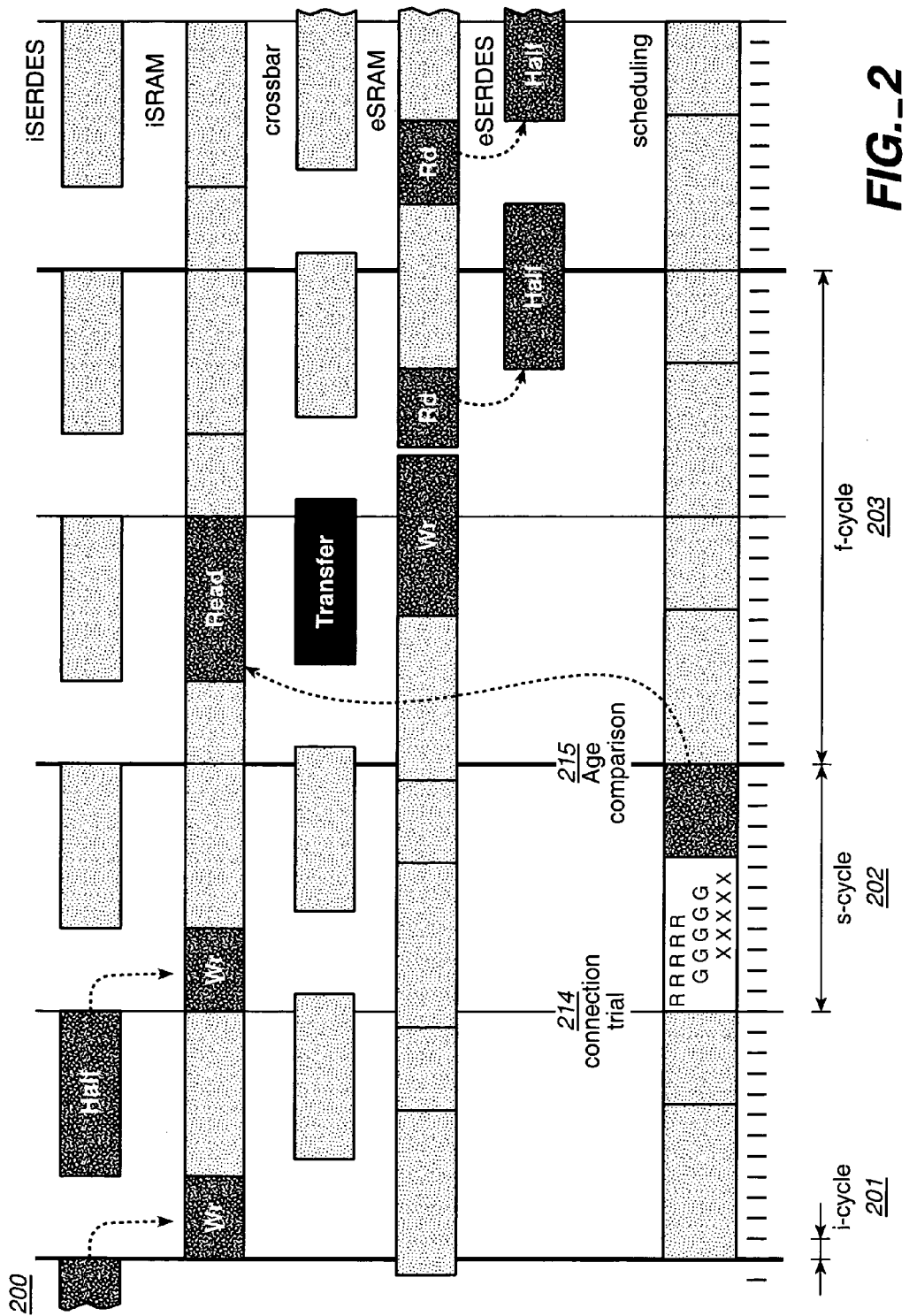
FIG._2

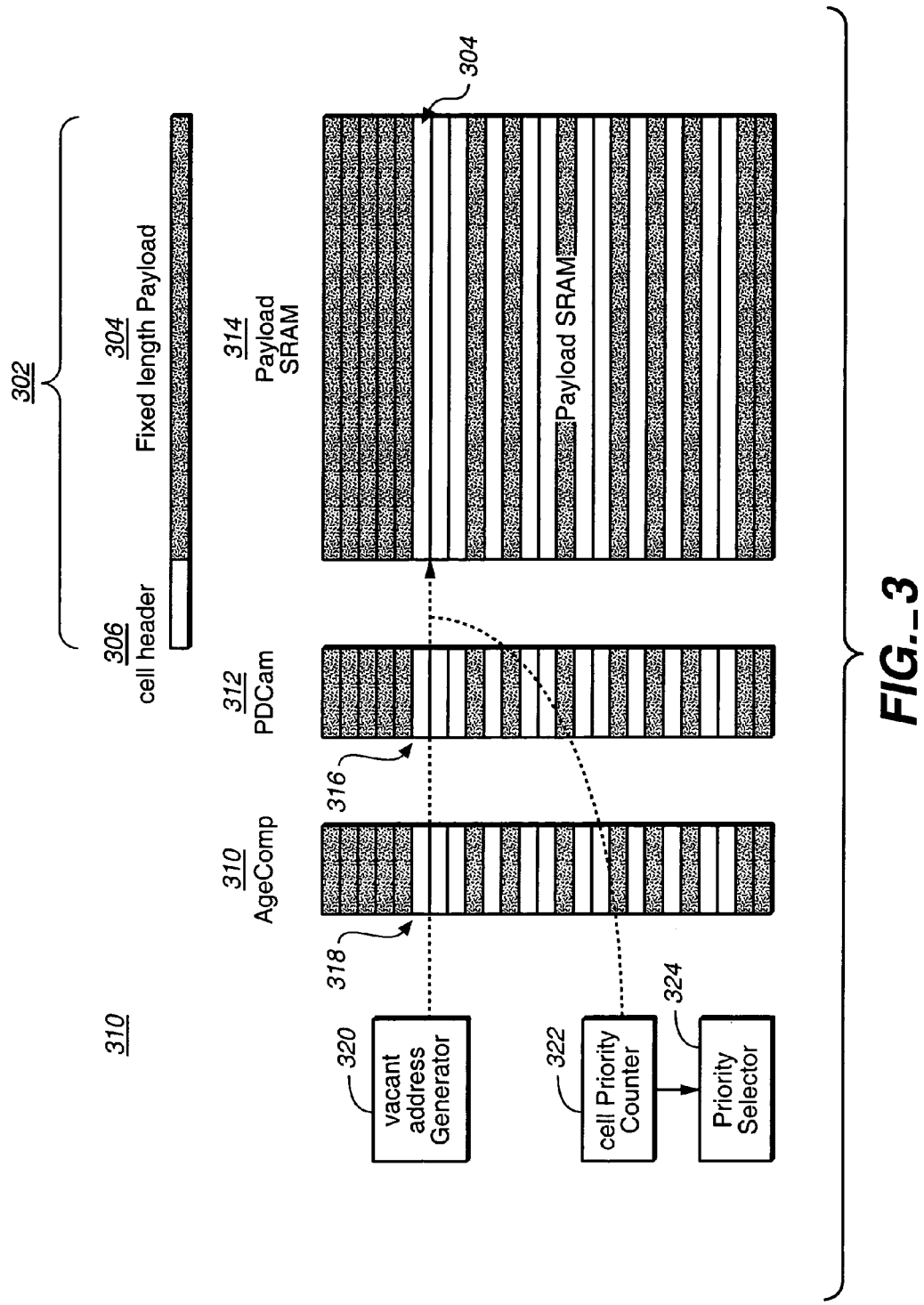
FIG._3

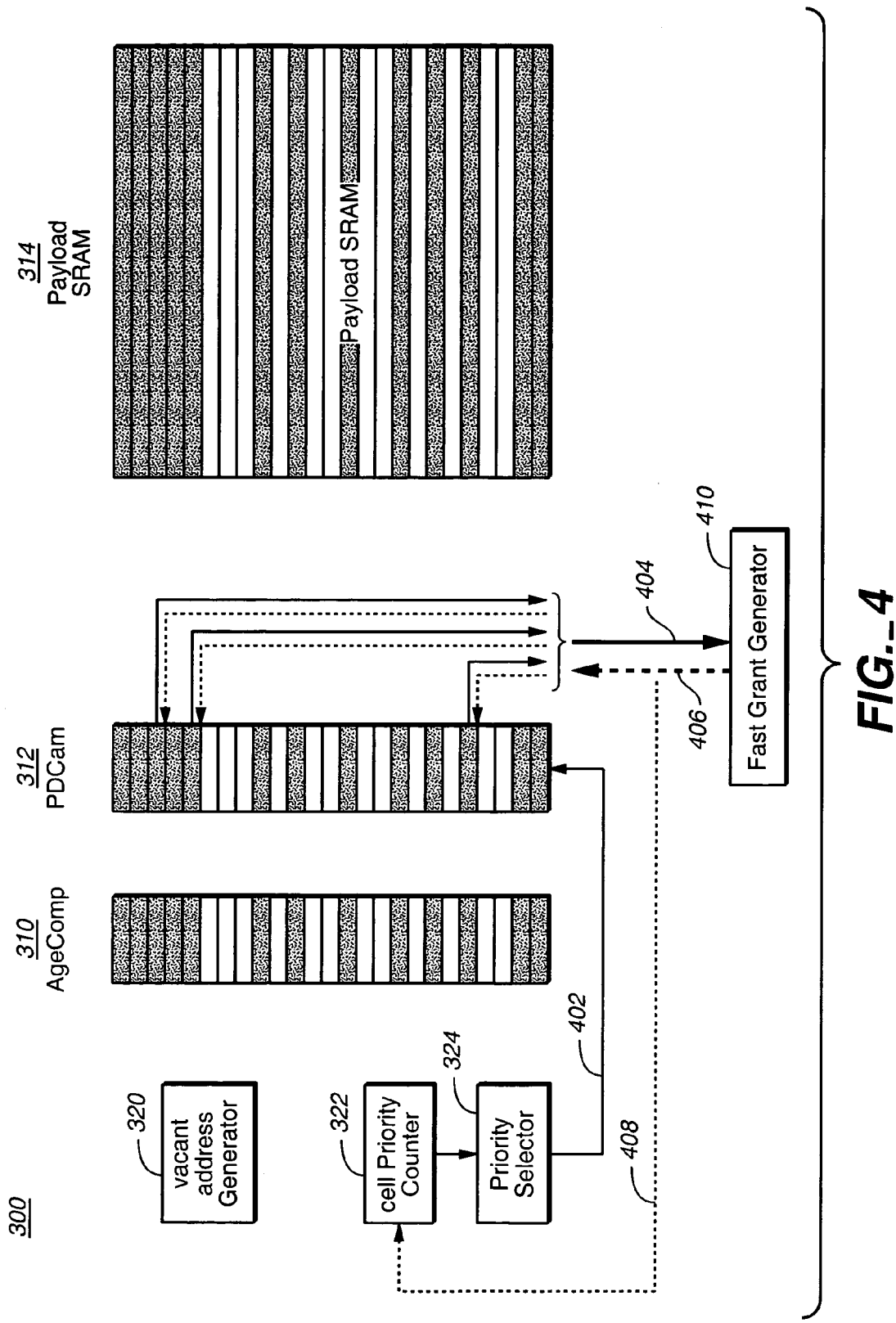
FIG._4

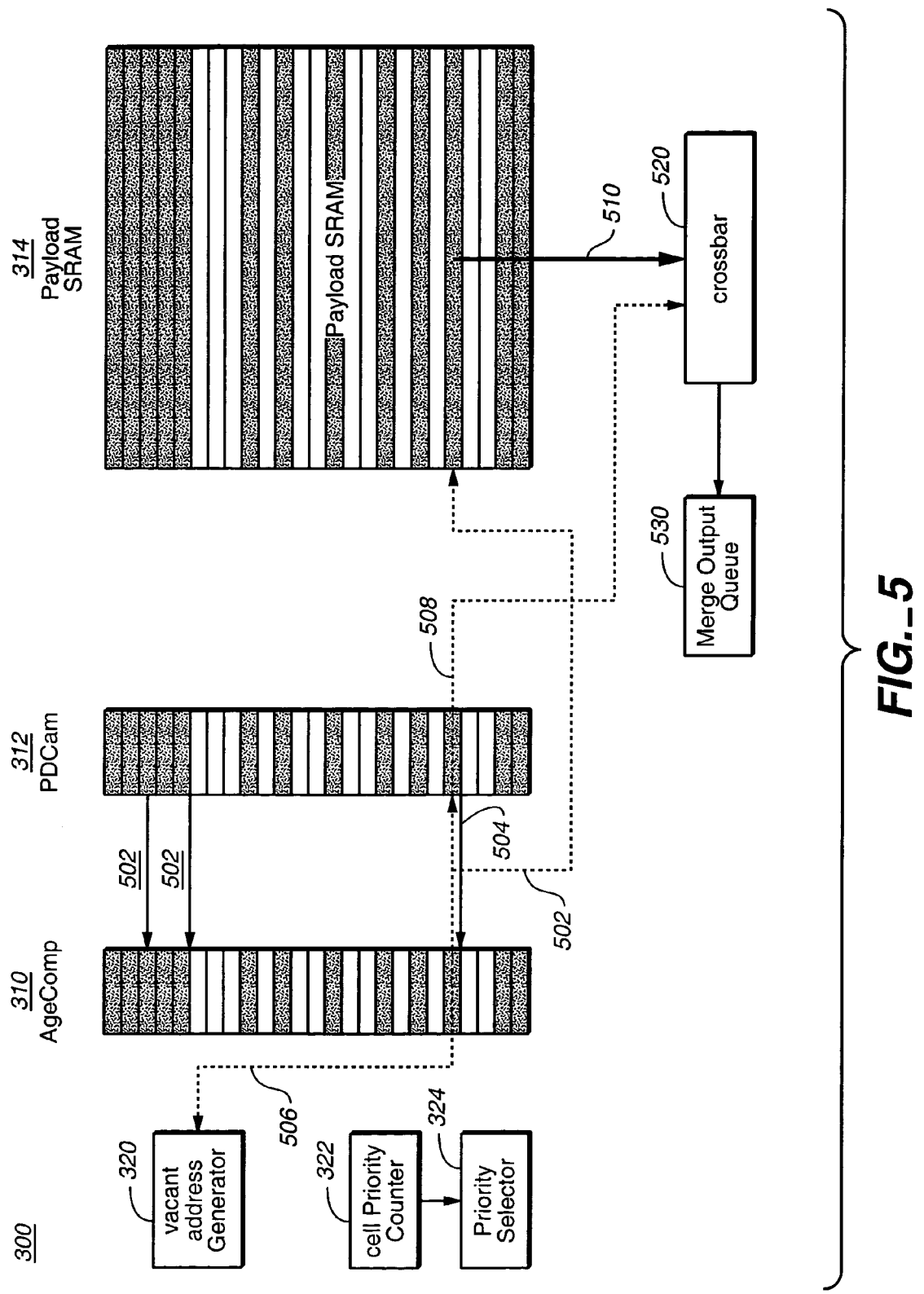
FIG._5

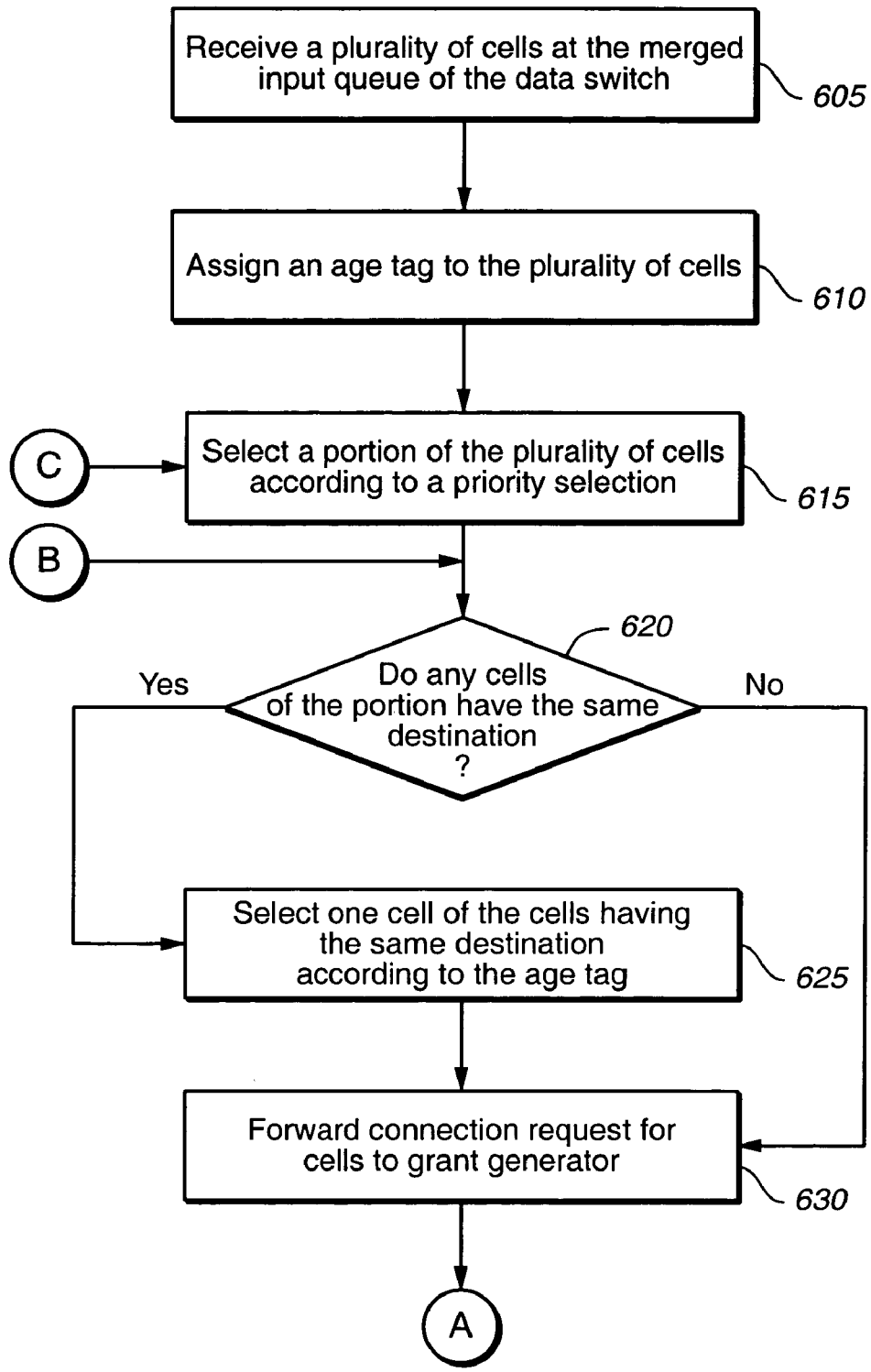
FIG._6A

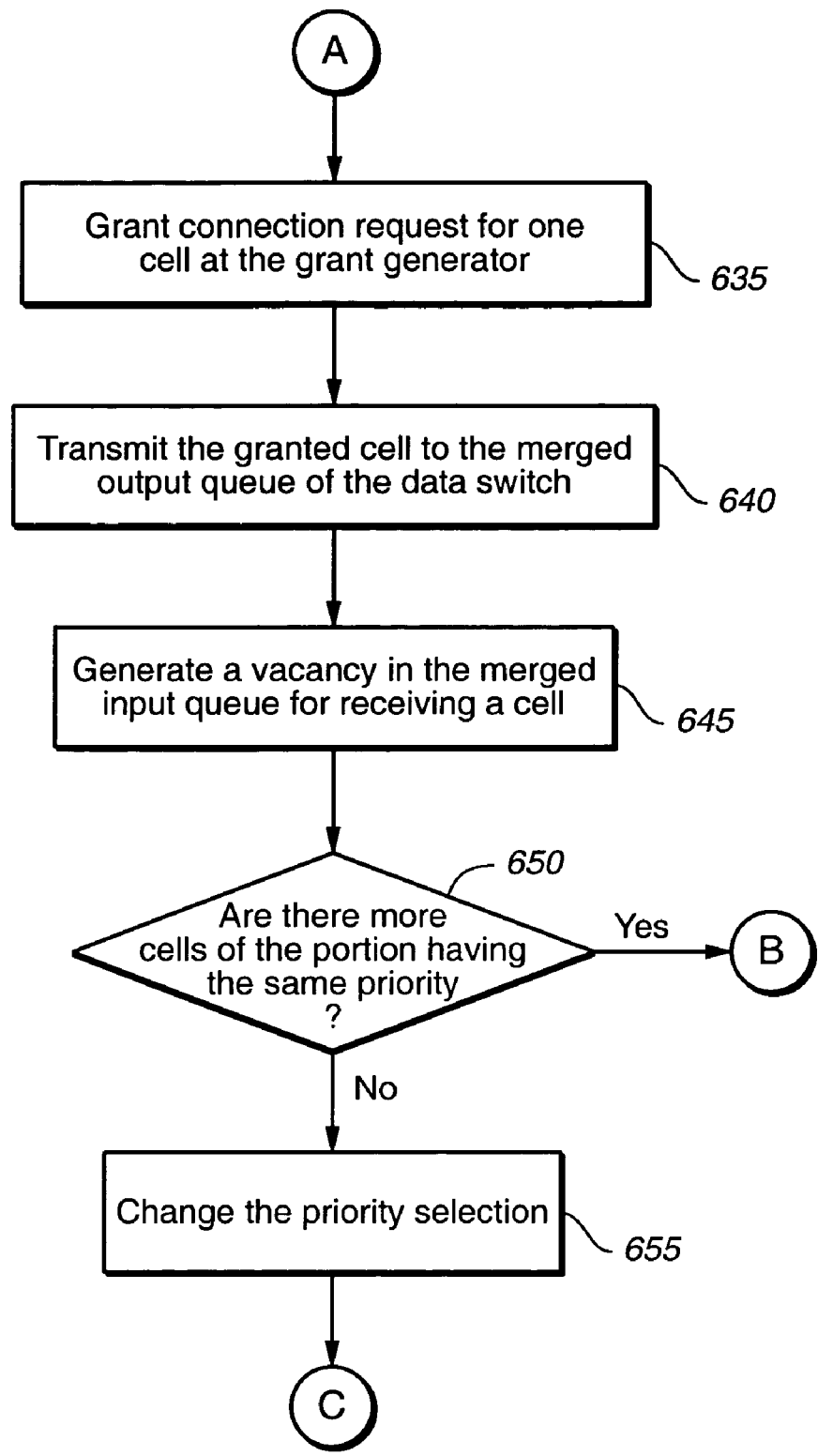
FIG._6B

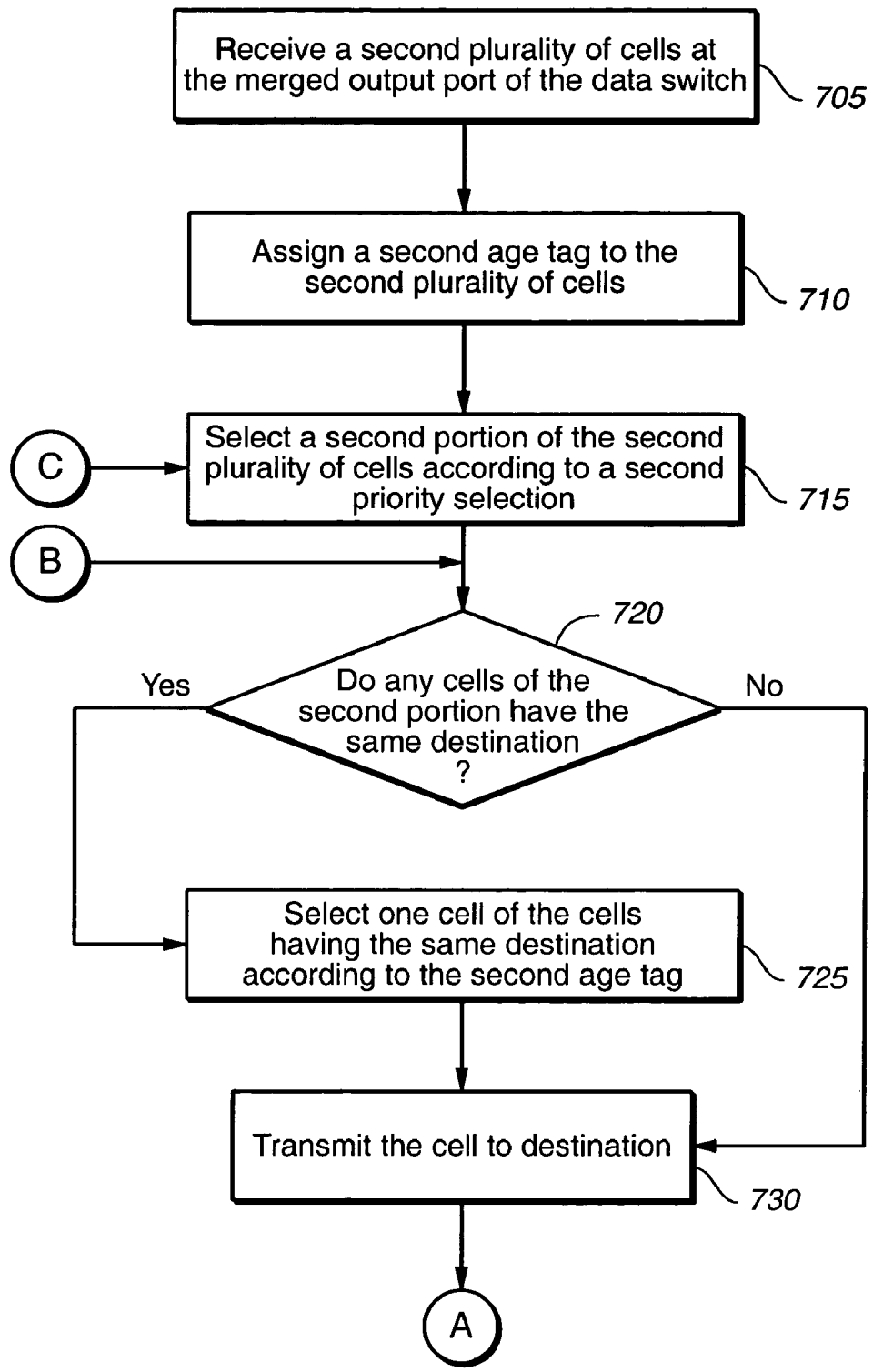
FIG._7A

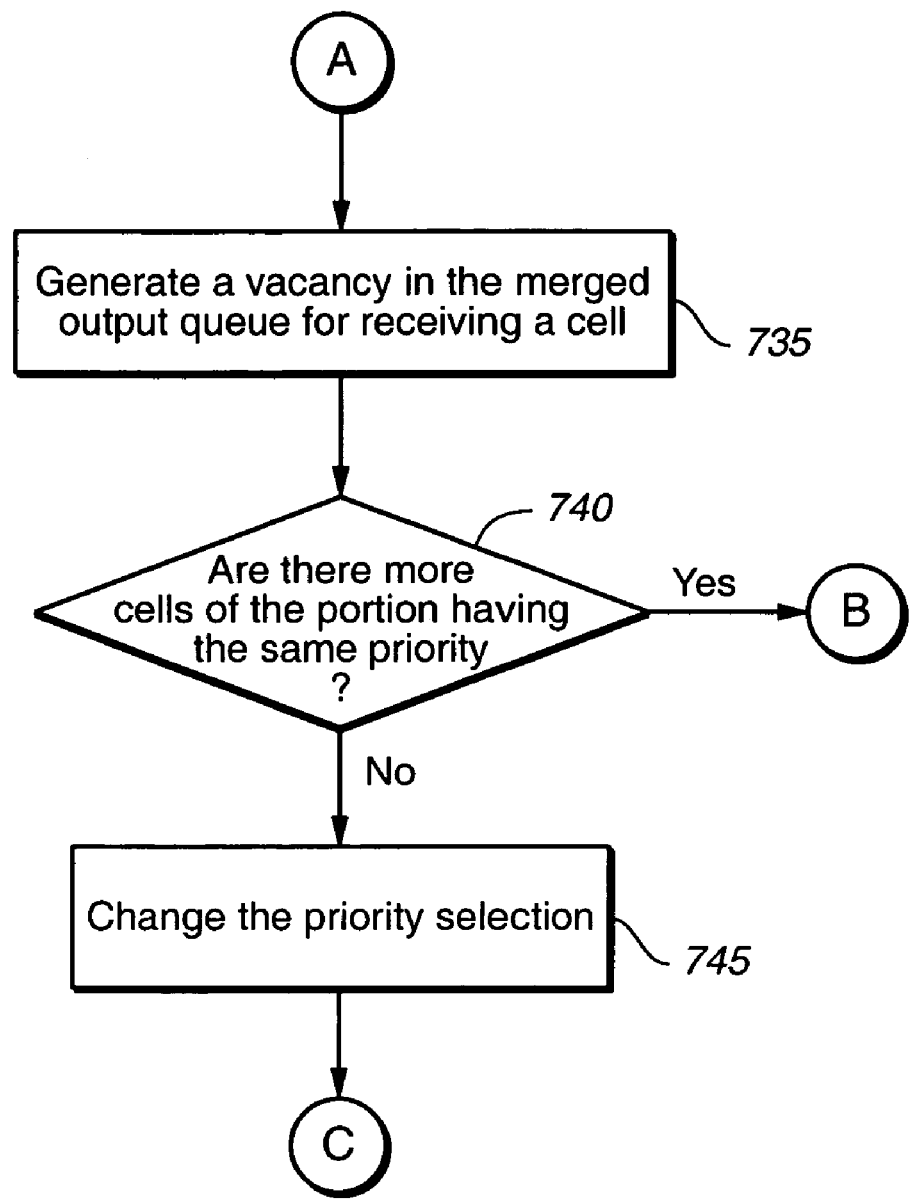
FIG._7B

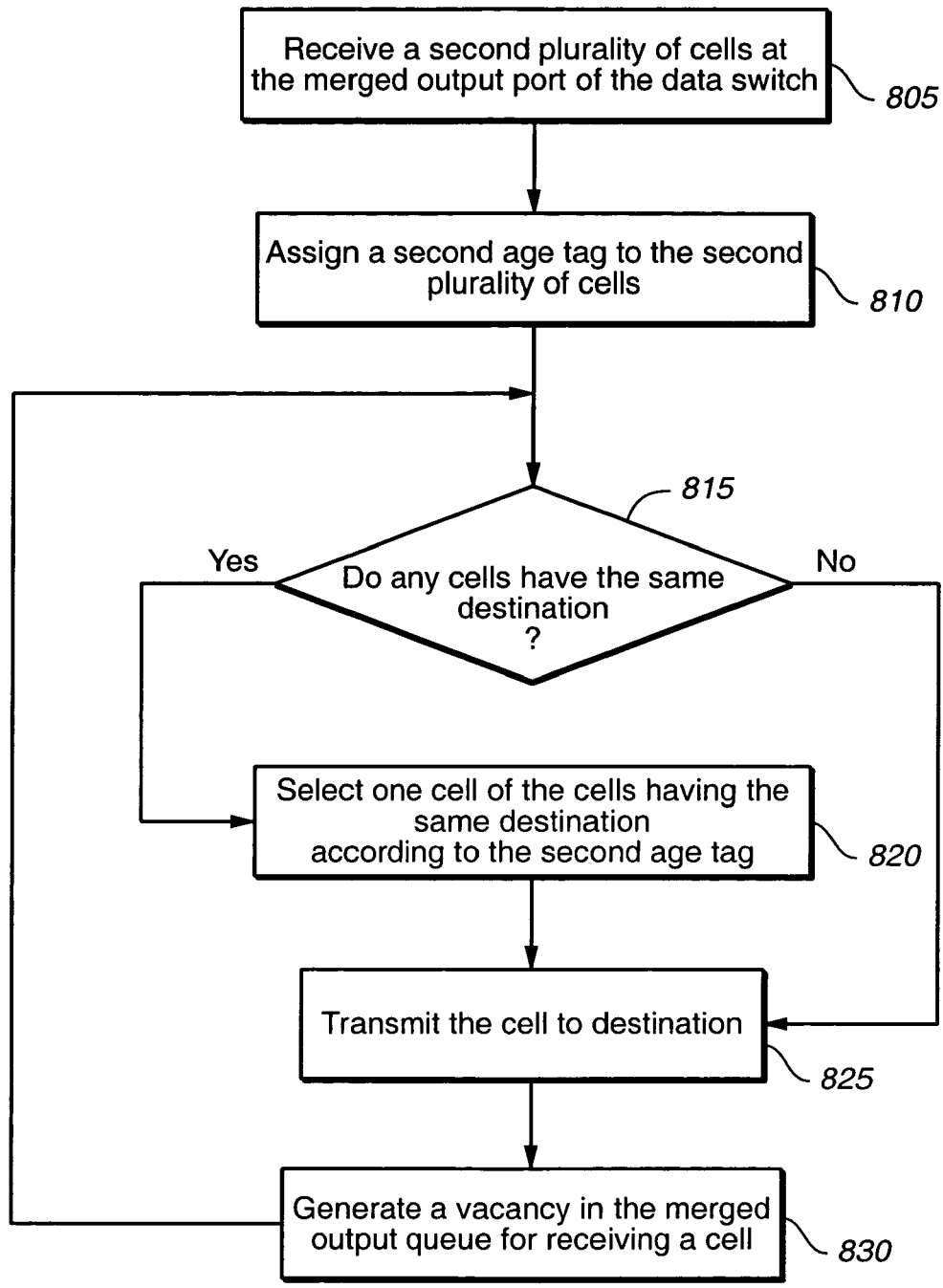
FIG._8

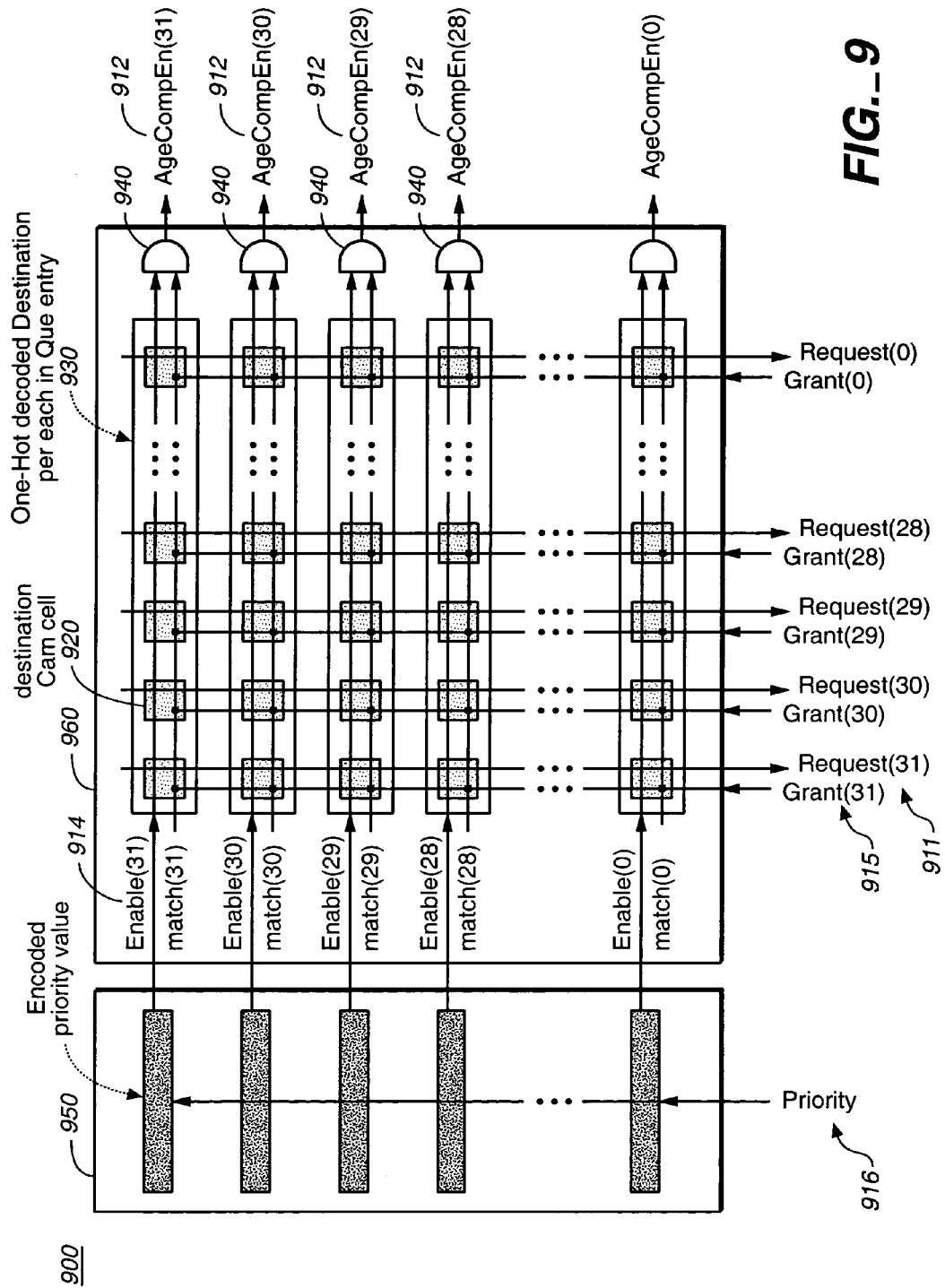
FIG._9

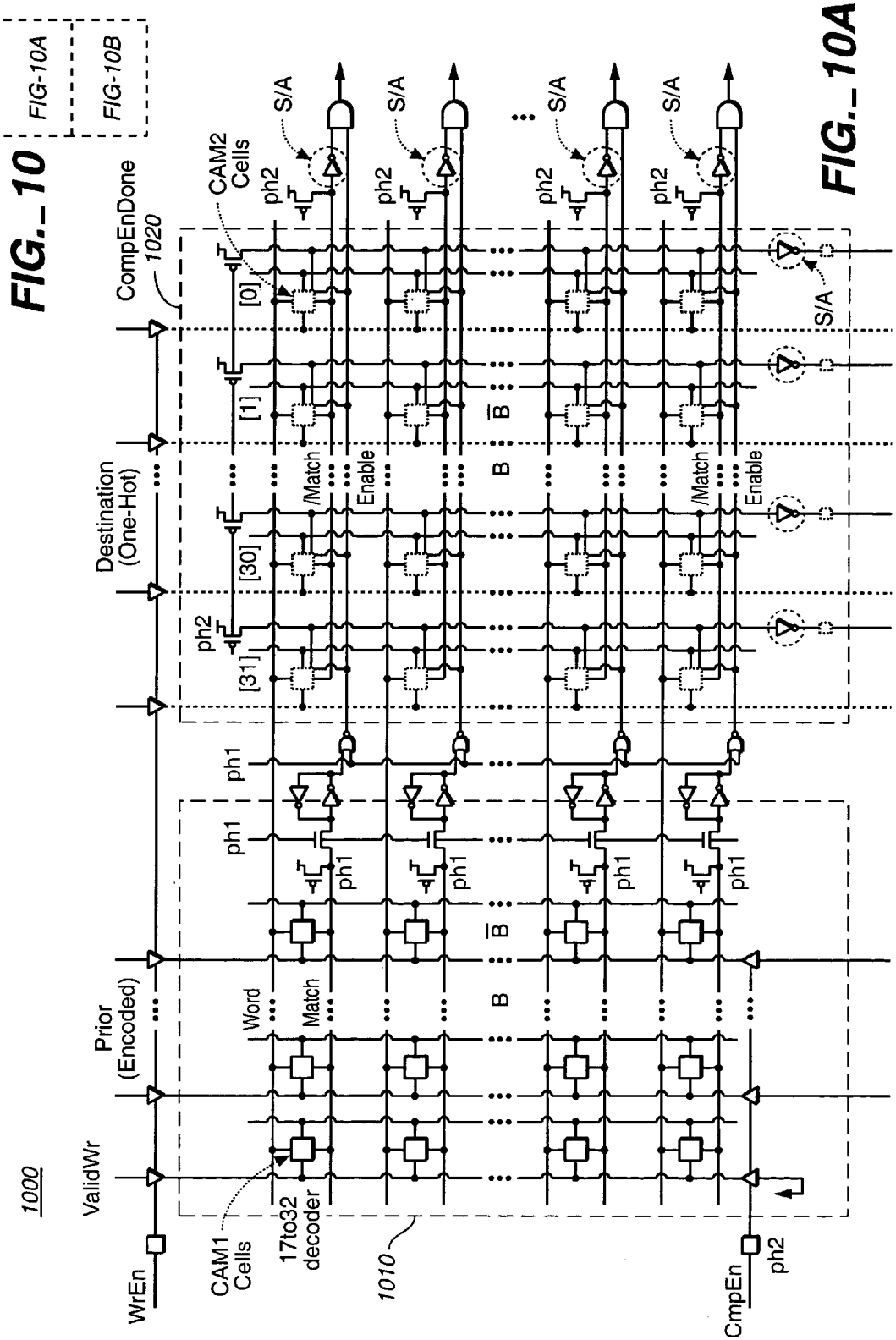

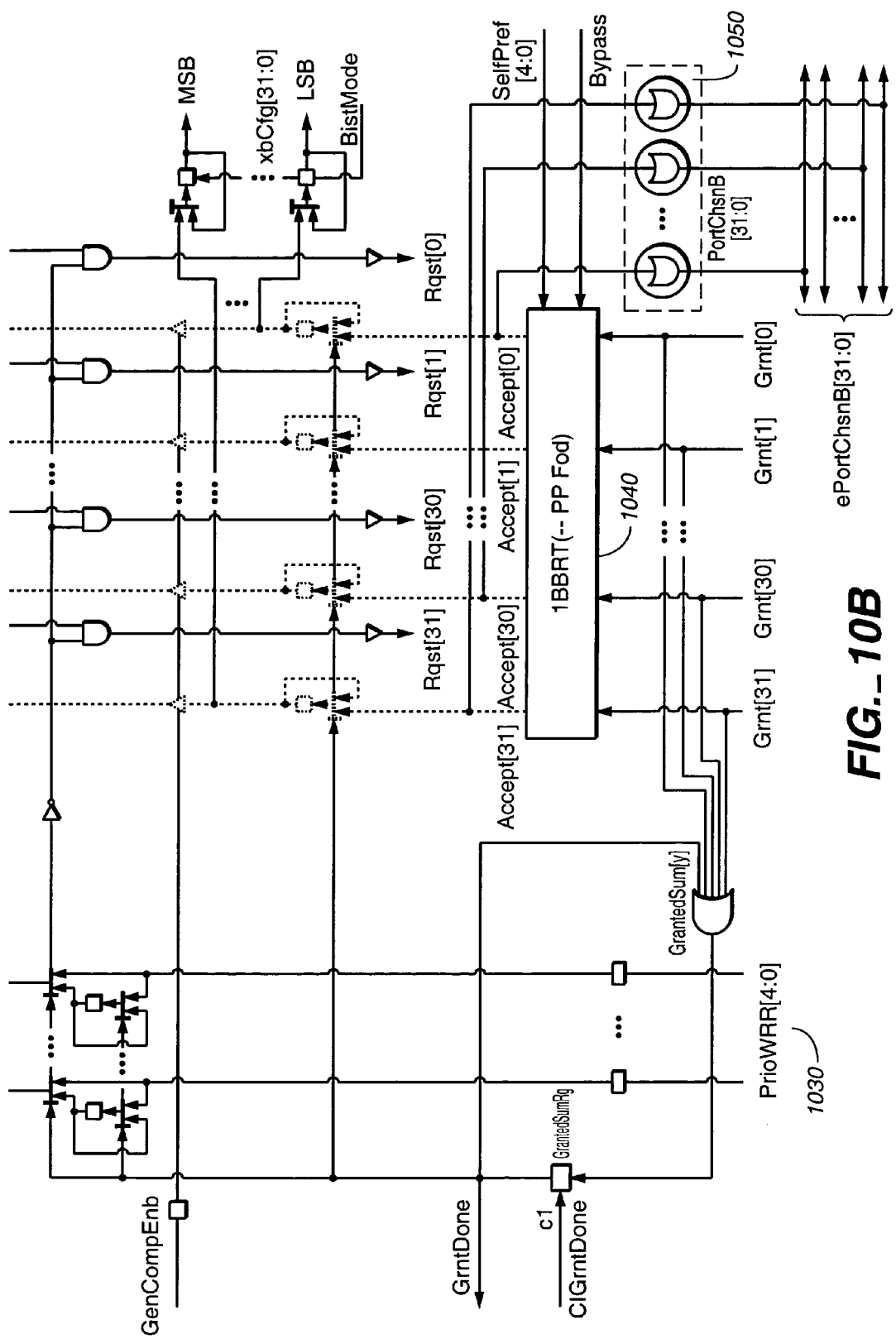
FIG._10B

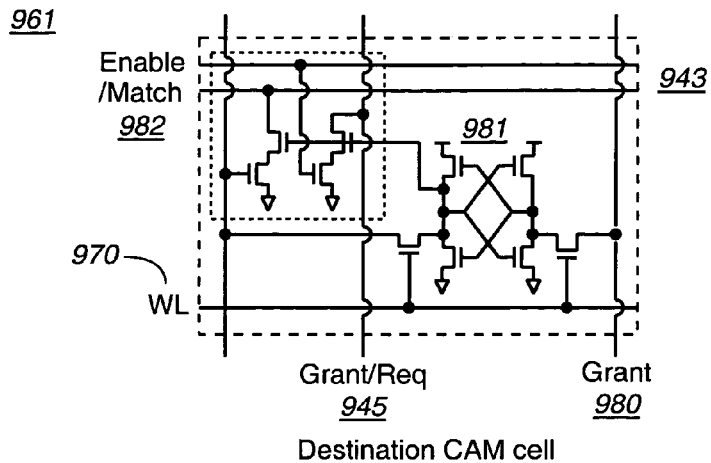
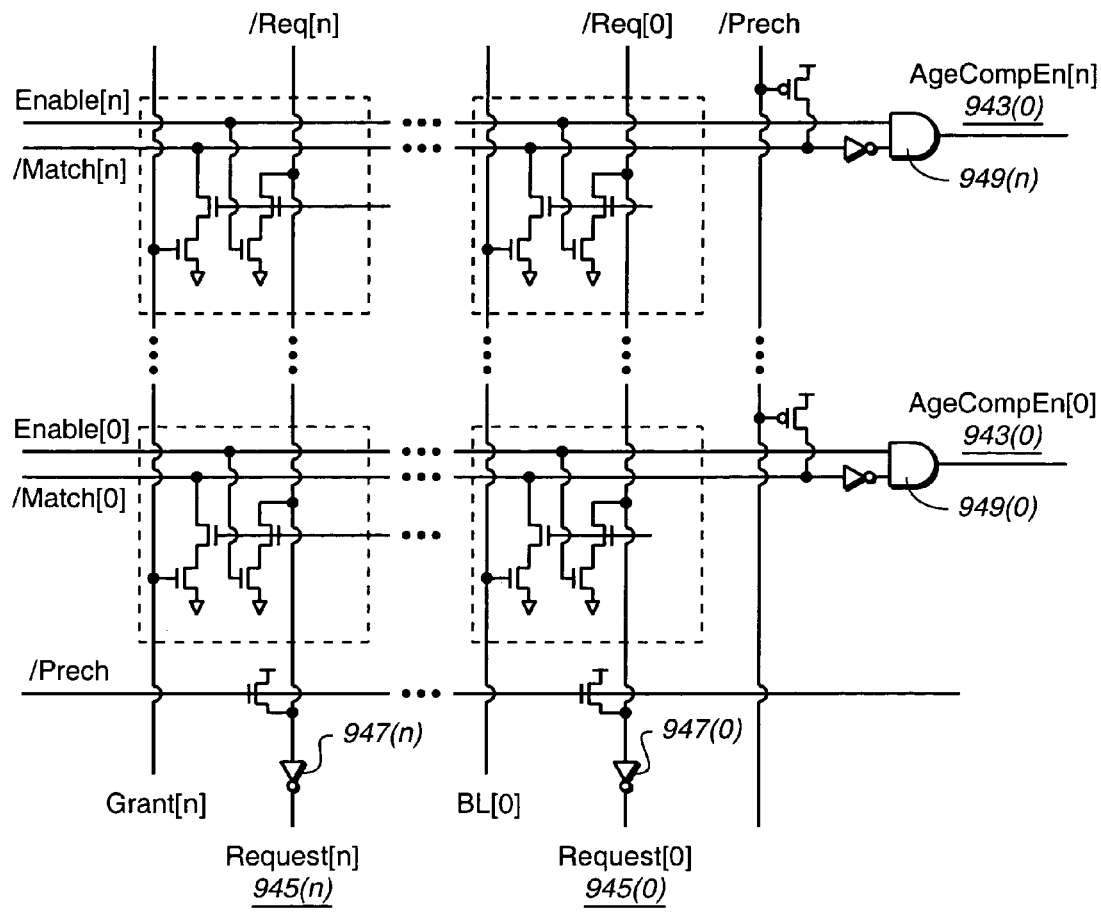
FIG._11

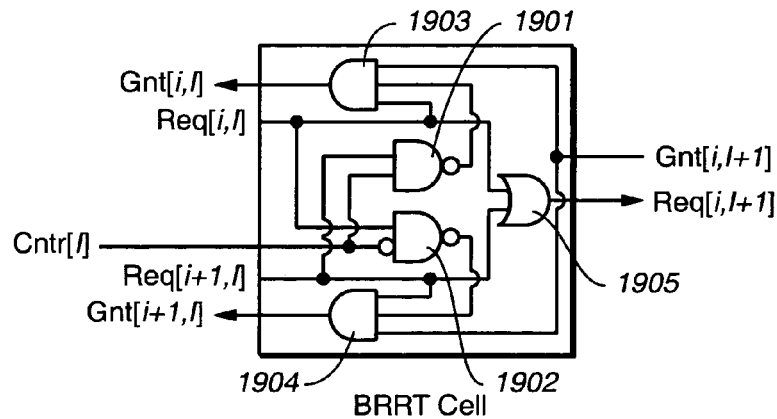
FIG._12A
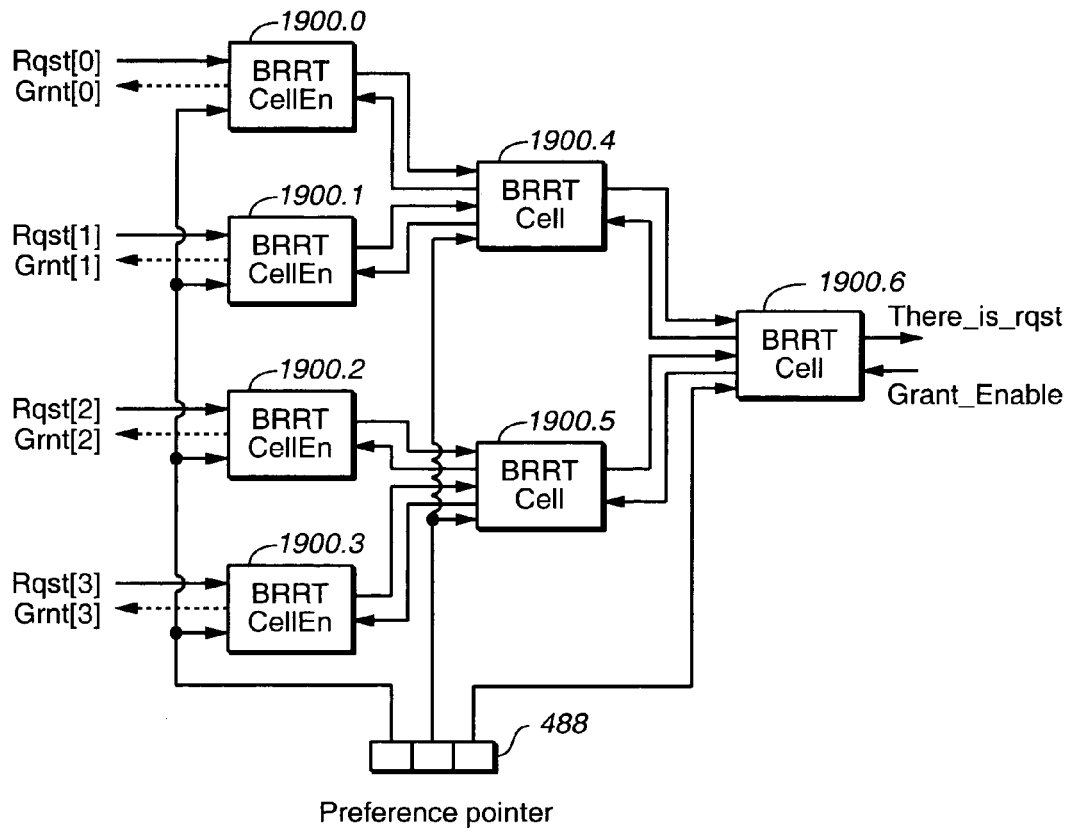
FIG._12B

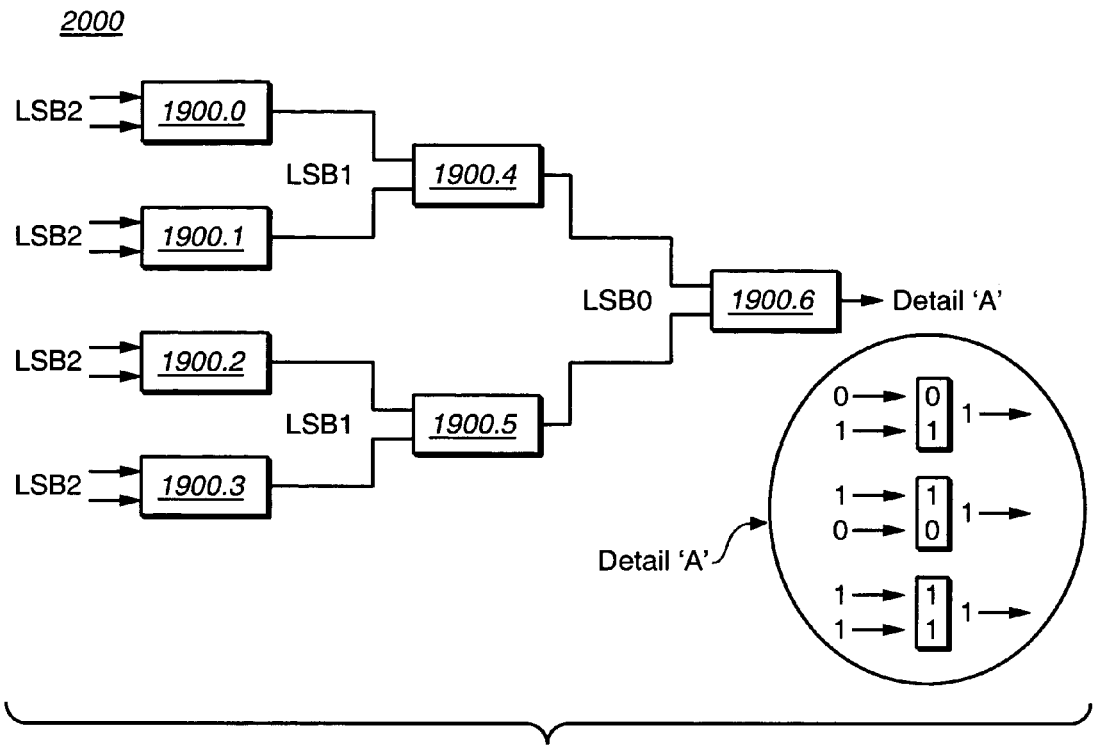
FIG._12C
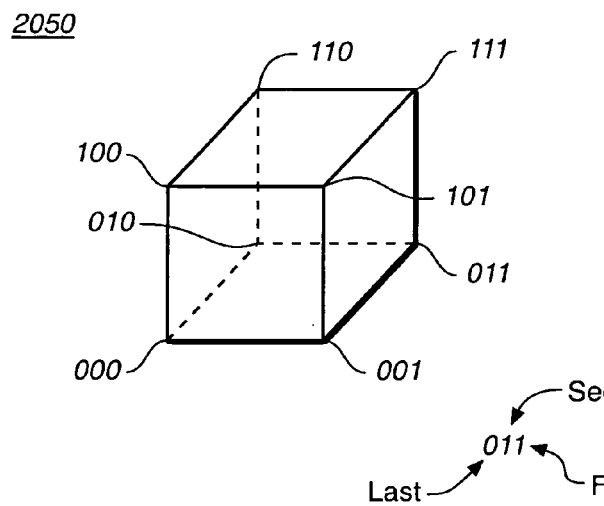
FIG._12D

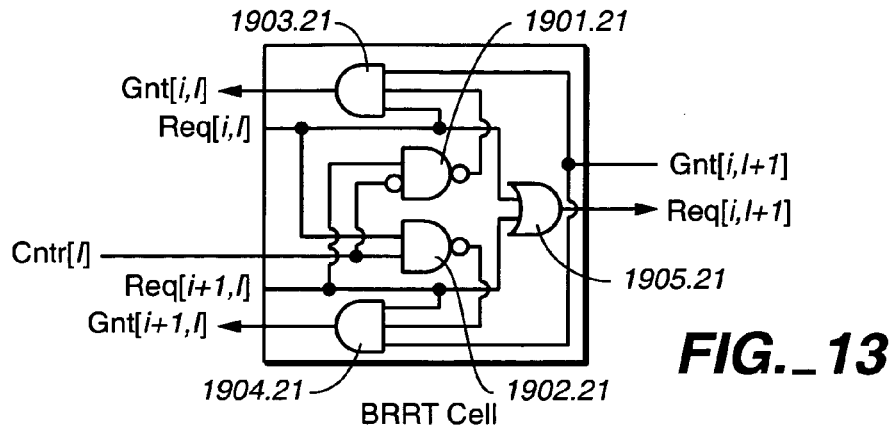
FIG._13
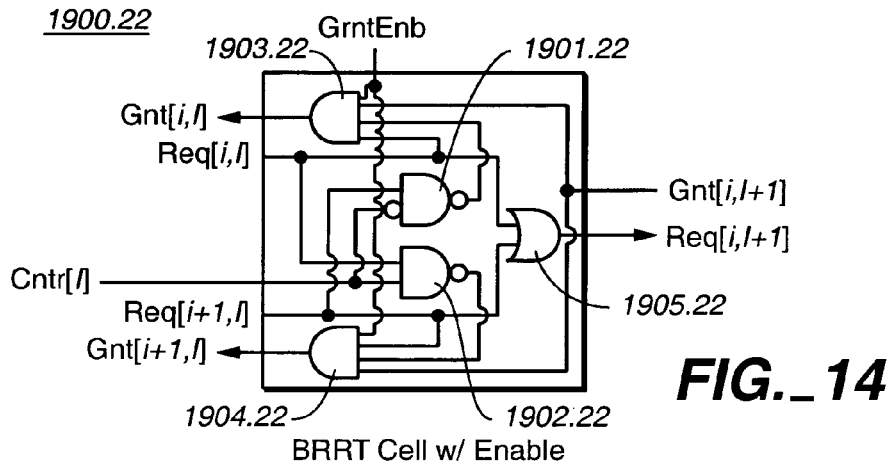
FIG._14
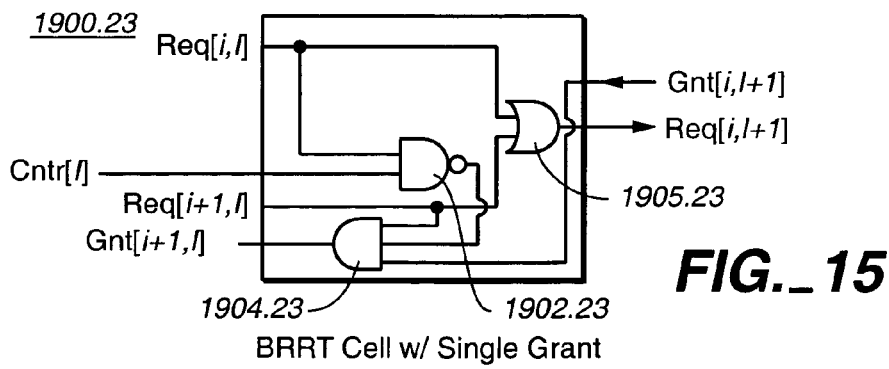
FIG._15
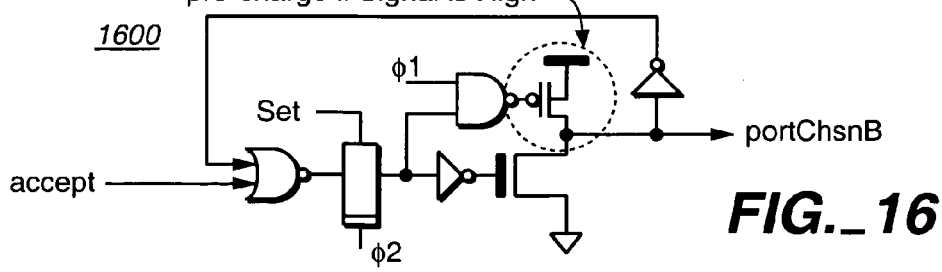
FIG._16

CONTENT ADDRESSABLE MERGED QUEUE ARCHITECTURE FOR SWITCHING DATA

RELATED UNITED STATES APPLICATION

This application is a continuation-in-part of co-pending U.S. patent application Ser. No. 10/434,785, entitled "A Method for Switching Data in a Crossbar Switch," with filing date May 8, 2003, by Sung Soo Park, and assigned to the assignee of the present application, and is a continuation-in-part of co-pending U.S. patent application Ser. No. 10/645,786, entitled "Preference Programmable First-One Detector and Quadrature Based Random Grant Generator," with filing date Aug. 20, 2003, by Sung Soo Park, and assigned to the assignee of the present application, and which, to the extent they are not repeated, are hereby incorporated herein by reference.

TECHNICAL FIELD

Embodiments of the present invention relate to the field of data switching. More specifically, embodiments of the present invention relate to a content addressable merged queue (camQ) for switching data in a crossbar switch.

BACKGROUND ART

Recent applications of packet based IP switching technology have extended to many areas, such as mobile infrastructure, Multi-Service Provisioning Platform (MSPP), high-speed Internet routers, Storage Area Network (SAN) equipment, and high-definition television. The current demand for higher bandwidth across the global network is driving a need for higher performance and higher port counts in "next generation" switching solutions.

Many of these high-speed switches are built around a crossbar architecture because of its speed and simplicity. Due to switching speed limitations, crossbar based architectures typically use input queues to hold packets or cells waiting to be transferred. A typical switching scheme applies the well known first in/first out (FIFO) regime to prioritizing the transfers from these queues. However, such simple FIFO input queues inherently suffer diminished performance because of head of line (HOL) blocking.

HOL blocking can be eliminated by applying a virtual output queue (VOQ) FIFO structure, but this poses strenuous demands on memory size. One such demand is that a VOQ FIFO architecture requires a memory size to grow according to the square of the number of port increases. Another such memory demand is presented by the per-flow queuing for quality of service (QoS).

The provision of QoS demanded by modern, advanced-architecture network systems requires the isolation of specific traffic flows among multiple flows, and each specific flow needs to have its own behavior characteristics and service level. A prerequisite for such isolation typically requires separate FIFO implementation for each flow. Together, the need for separate VOQ FIFOs for each QoS priority can drive a switch fabric solution to hundreds of chips. Therefore, providing enough memory within the switching function becomes a costly bottleneck for next generation switch fabric chip set vendors.

This can be illustrated by the following example. For a 32-port switch fabric with 32 priorities, 1024 FIFOs (32 destinations times 32 priorities) are required per port for per-flow QoS support and for elimination of HOL blocking. If the fixed cell size of 64 bytes is used and the cell depth of each VOQ is 64, then the overall memory requirement for the switch fabric system is 128 Mbytes (1024 VOQs times 64 cells per queue times 64 bytes per cell times 32 ports).

This huge memory size would be extraordinarily difficult and expensive, and perhaps impossible with contemporary processing technologies, to integrate into a cost effective, single chip solution. Thus, another approach should be taken to achieve small die size but without sacrificing performance. Examining actual Internet traffic indicates that average usage of this huge input buffer can be as low as less than 2% at 99% full input traffic rates. This low actual memory utilization rate offers opportunity for a different approach. However, taking advantage of the low actual memory utilization rate is problematic using conventional crossbar architectures.

Conventional crossbar architectures utilize separated queues for the detection and scheduling of cell transfer. This is problematic because of the large capacity, speed, and addressability demands made on memory resources and/or the large memory size such an approach requires, as discussed above. Further, even conventional crossbar switch architectures made with memories of capacity and addressability sufficiently large to accommodate such demands can pose other complicating problems.

Even for conventional crossbar switch architectures made with memories of capacity and addressability sufficiently large to accommodate the demands of detection and scheduling of cell transfer, implementing a FIFO regime thereon requires a pointer functionality to nominate and designate cells for transfer. The pointer functionality requires a pointer as well as a management system and/or process for its control. Implementing a FIFO regime with a large memory in a crossbar switch demands a complex pointer management system, which is difficult and expensive to implement in conventional technology.

A further problem with conventionally implementing crossbar switch architectures made with memories of capacity and addressability sufficiently large to accommodate the demands of detection and scheduling of cell transfer is that of retarded speed. The switching speeds of such conventional crossbar switch architectures are constrained by the addressability and size of the memory they field.

The conventional art is problematic therefore because memories of sufficient capacity and addressability for implementing a FIFO switching function in a crossbar switch using conventional architectures therefore are difficult and expensive to achieve, especially to support more than one QoS level, and in a single integrated circuit (IC; e.g., chip). The conventional art is also problematic because even if an adequate memory is achieved, the FIFO switching function of such a crossbar switch requires a complex pointer management system. Further, the conventional art is problematic because crossbar switches so constructed may operate at less than optimal switching speeds and bandwidths.

SUMMARY OF THE INVENTION

Accordingly, a need exists for a device for emulating a FIFO switching function in a single chip crossbar switch architecture that operates at a high switching speed with a large bandwidth and supports multiple QoS levels, yet does not demand an inordinately large number of input and output queues or otherwise excessively tax memory requirements. A need also exists for a device that satisfies the above need and does not require a complex pointer management system. Furthermore, a need exists for a device that satisfies the above needs and does not constrain switching speeds and bandwidth capacity of the FIFO switching function.

Various embodiments of the present invention, a content addressable merged queue (camQ) architecture for switching data, are presented herein. In one embodiment, the present invention provides a merged queue circuit comprising a first array of priority cells for indicating a priority of a plurality of cells and a second array of destination cells for indicating a destination of the plurality of cells. In one embodiment, the first array comprises five-bit priority cells. In one embodiment, the second array comprises five-bit destination cells.

A priority selector is operable to select a portion of the plurality of cells according to a priority selection. A grant generator for granting at least one connection request associated with cells of the portion. In one embodiment, the grant generator comprises a binary round robin tree for granting the connection request. In another embodiment, the grant generator randomly grants the connection request.

In one embodiment, the merged queue circuit further comprises an age selector for generating a connection request associated with a cell of the portion in response to a plurality of cells of the portion having the same destination. In one embodiment, the merged queue circuit further comprises a distributed OR gate for transmitting a cell to the destination.

In another embodiment, the present invention provides a method for switching data at a merged queue. A plurality of cells are received. A priority value of at least one cell of the plurality of cells is recorded at a priority cell array. In one embodiment, the priority cell array comprises five-bit priority cells. A destination value of at least one cell of the plurality of cells is recorded at a destination cell array. In one embodiment, the destination cell array comprises five-bit destination cells. In one embodiment, an age tag is assigned to at least one cell of the plurality of cells.

A priority selection is received for selecting a portion of the plurality of cells. At least one connection request associated with cells of the portion is granted. In one embodiment, the granting at least one connection request is performed according to a binary round robin tree (BRRT). In another embodiment, the granting at least one connection request is performed randomly. In one embodiment, a connection request associated with a cell of the portion assigned an older age tag is generated in response to a plurality of cells of the portion having the same destination.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a block diagram of an 8-port quadrant of an exemplary 32-port crossbar switch featuring a content addressable merged queue (camQ) architecture, in accordance with one embodiment of the present invention.

FIG. 2 depicts a clock relationship by which a camQ switching functionality operates, in accordance with one embodiment of the present invention.

FIG. 3 is a data flow diagram of a camQ receiving a cell, in accordance with one embodiment of the present invention.

FIG. 4 is a data flow diagram of a camQ servicing connection requests for cells of the same priority, in accordance with one embodiment of the present invention.

FIG. 5 is a data flow diagram of a camQ comparing age tags of cells having the same priority and destination, in accordance with one embodiment of the present invention.

FIGS. 6A and 6B are a flowchart illustrating steps in a process for switching data at a merged input queue of a data switch, in accordance with one embodiment of the present invention.

FIGS. 7A and 7B are a flowchart illustrating steps in a process for switching data at a merged output queue of a data switch, in accordance with one embodiment of the present invention.

FIG. 8 is a flowchart illustrating steps in a process for switching data at a merged output queue of a data switch, in accordance with another embodiment of the present invention.

FIG. 9 is a block diagram of a camQ architecture, in accordance with one embodiment of the present invention.

FIGS. 10A and 10B provide a circuit diagram of a camQ architecture, in accordance with one embodiment of the present invention.

FIG. 11 is a circuit diagram of a camQ block, in accordance with one embodiment of the present invention.

FIG. 12A is a circuit diagram of a Binary Round Robin Tree (BRRT) cell, in accordance with one embodiment of the present invention.

FIG. 12B is a circuit diagram of a BRRT structure, in accordance with one embodiment of the present invention.

FIG. 12C is a block diagram of another BRRT structure, in accordance with an embodiment of the present invention.

FIG. 12D is a diagram of a cubical count field, in accordance with an embodiment of the present invention.

FIG. 13 is a circuit diagram of another BRRT cell, in accordance with an embodiment of the present invention.

FIG. 14 is a circuit diagram of a BRRT cell with 'Enable', in accordance with an embodiment of the present invention.

FIG. 15 is a circuit diagram of a BRRT cell with a single grant, in accordance with an embodiment of the present invention.

FIG. 16 is a circuit diagram of an OR gate of a distributed OR gate, in accordance with one embodiment of the present invention.

DETAILED DESCRIPTION OF THE INVENTION

Various embodiments of the present, a method for switching data in a data switch comprising a content addressable merged queue (camQ) for high-speed switch fabric solutions, are disclosed herein. In the following detailed description of the present invention, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by electronic systems. These descriptions and representations are used by those skilled in the electronic arts to most effectively convey the substance of their work to others skilled in the art. A procedure, system executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical signals capable of being stored, transferred, combined, compared, and otherwise manipulated in an electronic system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "assigning," "selecting," "determining," "transmitting," "granting," "generating," "forwarding," or the like, refer to the action and processes of an electronic system (e.g., quadrant 100 of FIG. 1), or similar electronic system, that manipulates and transforms data represented as physical, e.g., electrical quantities within the systems' queues, registers, and memories into other data similarly represented as physical quantities within the systems' queues, memories, or registers or other such information storage, transmission, or display devices.

Further, embodiments of the present invention may be discussed in terms of computer processes. For example, FIGS. 6A and 6B depicts process 600, performed in accordance with embodiments of the present invention for age comparison. Although specific steps are disclosed in FIGS. 6A and 6B describing the operations of these processes, such steps are exemplary. That is, embodiments of the present invention are well suited to performing various other steps or variations of the steps recited in the flowchart herein.

Exemplary Crossbar Switch Platform Deploying CamQ Architecture

FIG. 1 depicts an 8-port quadrant 100 of an exemplary 32-port crossbar switch featuring a camQ architecture, in accordance with one embodiment of the present invention. Quadrant 100 exemplifies a content addressable merged queue (camQ) architecture for high-speed switch fabric solutions. This architecture reduces the capacity, which would otherwise be required for input and output queues for crossbar switches significantly. This reduction in memory requirements is effectuated by the use of small payload SRAM in ingress SRAM (iSRAM) 103 and egress SRAM (eSRAM) 105, and special content addressable merged (CAM) memory cells for priorities and destinations of the cells in the payload SRAM (e.g., iSRAM 103 and eSRAM 105), as well as by deployment of age tag comparators 107 and 109. The CAM cells are deployed in ingress CAM (iCAM) 123 and egress CAM (eCAM) 125.

The CAM cells in the iCAM 123 and eCAM 125 stores the payload destinations of cells, which can be addressed by cell priorities. Once a priority for the quality of service is decided, all the cells with the selected priority in the payload can make their connection requests to the destination ports directly through iCAM 123 and eCAM 125. Advantageously, this avoids HOL blocking by the cells ahead whose destination was blocked for some reason. Ingress age tag comparator 107 assigns an age tag to each incoming cell. Egress age tag comparator 109 selects the oldest cell and assigns it an age urgency. Age tag comparators 107 and 109 thus effectuate a FCFS feature for the crossbar switch fabric 101.

Traffic through crossbar component 101 is controlled in one embodiment by a dual age-priority (AP) switching process. Traffic into ingress SRAM 103 is controlled by ingress controller 113. Traffic for export via egress SRAM 105 is controlled by an egress controller 115. An urgency based weighted round robin (UWRR) flow controller 127 handles connection requests and correspondingly schedules and controls fabric traffic, based in part on the age urgency assigned by egress age comparator 109. Cells are granted connection by grant generator 129.

In one embodiment, the camQ architecture 100 switches at a speed that is twice that of the line speed, thus effectuating a combined input and output queued (CIOQ) crossbar architecture. In the present embodiment, the 32×32 CIOQ camQ architecture 100 with its switching speed of 2—(1/32) emulates a 32×32 FIFO output queue switch. In one embodiment, timing sequences characterizing the operation of camQ architecture 100 help to effectuate this and other features.

Exemplary Operational Clocking and Priority Selection

Exemplary Clocking

With reference to FIG. 2, a timing sequence 200 depicts the sequence of operation of a camQ architecture, according to one embodiment of the present invention. In the present embodiment, three different clock cycle speeds are operational. These include the i-cycle 201, the s-cycle 202, and the f-cycle 203. Incoming cells are synchronized to f-cycle 203 at the rate of one cell per f-cycle 203. Considering overheads, such as 8b10b encoding, cell boundary synchronization, and cell header information (including cell ID, in-band flow control, cell priority and destination), approximately 15 Gbps of serial link bandwidth is required for an actual Gbps of payload traffic in an OC-192 data rate. In the present embodiment, internal data parallelism and high-speed 500 MHz internal clocking effectuate 64-byte cell framing at the 20 MHz rate of f-cycle 203.

Transferal of cells to an output queue is based on s-cycle 202. In the present embodiment, s-cycle 202 operates at twice the speed of f-cycle 203. Thus, two cells can be transferred through the crossbar (e.g., crossbar 100 of FIG. 1) per one f-cycle 203. The effective internal payload switching bandwidth of the crossbar is thus Gbps per port. In as much as the entire cell reading and transferring are done at on-chip SRAM (e.g., iSRAM 103, eSRAM 105 of FIG. 1), the 20 Gbps internal bandwidth is supported (64 bit read per 2 nsec equals 32 Gbps).

During one s-cycle 202, there are five connection trials 214 to output queues based on the fastest clock, which is i-cycle 201. When a cell successfully gets connection to its destination, there follows an age tag comparison 215 for the selection of the oldest cell with the destination. All of the connection trials 214 and age comparisons 215 are completed within a single s-cycle 202.

In one embodiment, connection trials are repeated where previous trials did not succeed until successful. In one embodiment connection trials are repeated until successful, or until up to five connection trials have been unsuccessfully completed in a s-cycle 202. In another embodiment, connection trials are repeated until successful, or until some other number of connection trials have been unsuccessfully completed in a s-cycle 202. Each subsequent connection trial is run for egress ports, which have not been connected for the cell transfer. Thus, the probability for connection trial success is smaller than for earlier trials. In one embodiment, extending connection trials beyond five, with even lower probabilities of successful connection (and significance), are forgone. Advantageously, this conserves resources. In another embodiment, more than five connection trials can be performed in a s-cycle 202.

During the connection trial, the priority level of the cells is decided. Connection requests are generated accordingly and made to a grant generator (e.g., grant generator 129 of FIG. 1, grant generator 1040 of FIG. 10B). One embodiment achieves the advantage of higher performance with a weighted round robin (WRR) based priority selection, a process known in the art. In another embodiment, other selection schemes are used, such as strict priority based selection. Conventional WRR based priority selection algorithms would give to each cell the same chance of selection if the accumulated weight is greater than certain one criterion, a term known in the art. The WRR based priority selection process employed by an embodiment of the present invention however applies additional criteria in its selection process, e.g., the number of different available trial slots and the urgency level associated therewith.

Urgency Based Priority Selection

In the present embodiment, e.g., five different trial slots each have different success probabilities. Thus, the present embodiment assigns multiple urgency levels for WRR selection criteria. This urgency based WRR (UWRR) works with five different levels of selection criteria, called urgency levels. At each of the five connection trials, the trial will be made only for the priorities that have higher urgency level than a pre-determined urgency value of that trial slot. The higher the urgency level, the earlier its corresponding connection trial will be made.

Each of 32 priority levels will be mapped to these urgency levels with a different initial urgency. As a pre-determined period passes by without any connection success, the corresponding urgency increases. The priority selection for the connection trial is done by Round-Robin manner among the priorities with the same urgency level. Unlike conventional WRR, UWRR does not make any connection requests for lower urgency cells at earlier connection trials, even if it has higher priority. Typically, the cells with higher urgencies, rather than those with higher priorities, make earlier connection trials. In return, advantageously, this lack of a request (e.g., forestalling on generating one) effectively guarantees higher connection success rates for more urgent requests from other ports. One embodiment operates in a time division multiplexing (TDM) support mode. In the TDM support mode, TDM cells use the first connection request stage, where the normal cells cannot make any connection request in this mode, virtually assuring that the connection will succeed for that TDM cell.

Output Buffer Considerations

Even if cells can be sent to their egress destinations two times faster than its line speed within a chip, it is not easy conventionally for the switch fabric chip to send the egress cells to the outside world at that higher rate. Usually, the line speed is limited by the serializer-deserializer (SERDES) performance, and both ingress and egress SERDES circuits work at the same speed. The Traffic Manager or NPU may not be able to handle two times faster traffic input either, by its lack of processing capability. If there is temporary over-subscription to a certain destination, the egress cells begin to stay at the output buffer. Embodiments of the present invention however, effectuate handling switching traffic at twice line speed.

One embodiment treats the egress traffic bandwidth to be the same as ingress traffic bandwidth. The present embodiment implements simple output buffers, because there is no need for connection scheduling there. These output buffers thus accord an advantageous place for implementing QoS control in the present embodiment. Whereas conventionally, separated priority FIFOs in output queue buffers implement QoS control, the present embodiment uses the same priority CAM and age tag comparison structure to maximize the output buffer usage. No destination field exists in the egress CAM. The QoS cell selection at the output buffer is scheduled with relative ease. Priority for launching cells is assigned by simple WRR. This assigned priority is given to the CAM and the age tag comparator. The CAM and age tag comparator then decide a specific corresponding cell with that priority.

In the present embodiment, the output queue is implemented on the order of four times deeper, relative to conventional art. Burst destined traffic is thus handled expeditiously in the output queue. Further flooding of cells to a certain egress buffer causes "back-pressure" to the ingress side traffic managers. This back-pressure stops further cells from being sent to the specific destination port. Further, the presence of this back-pressure is broadcast to other ingress traffic managers by an egress cell header. The present embodiment thus effectuates in-band "per-destination" flow control.

Switching Data at a Crossbar Switch Platform Deploying CamQ Architecture

FIG. 3 is a data flow diagram of a camQ 300 (e.g., a merged input queue) receiving a cell 302, in accordance with one embodiment of the present invention. In one embodiment, cell 302 is received from an input port of camQ 300. In one embodiment, camQ 300 comprises a plurality of input ports coupled thereto. In one embodiment, camQ 300 comprises 8 input ports. In another embodiment, camQ 300 comprises 32 input ports.

Cell 302 is an exemplary cell that is received at camQ 300. Cell 302 comprises payload 304 and header 306. In one embodiment, payload 304 has a fixed length of 64 bytes. Header 306 comprises information characterizing a priority of cell 302 and the destination of cell 302. In one embodiment, the priority identifies the QoS for cell 302. The destination identifies the payload destination (e.g., output port) of cell 302. Upon receipt of cell 302, the priority and destination (e.g., header 306) are stored in Priority/Destination Content Addressable Memory (PDCam) 312 and payload 304 is stored in payload SRAM 314.

In one embodiment, header 306 and payload 304 are stored in a vacant address of PDCam 312 and payload SRAM 314, respectively. In one embodiment, vacant address generator 320 identifies and directs the cell to the vacant address. It should be appreciated that cell 302 may be placed anywhere in camQ 300, and is not limited to any one address in particular. In particular, camQ 300 is operable to search PDCam for cells having a particular priority, as explained below, and is not directed to specific addresses.

At the receipt of cell 302, age tag comparator 310 assigns age tag 318 to cell 302. An age tag indicates the relative length of time a cell has been in camQ 300 as compared to other cells in camQ 300. In one embodiment, age tag comparator 310 incrementally assigns an age tag to an incoming cell, such that the lower the age tag value, the longer a cell has been in camQ 300.

Cell priority counter 322 is operable to determine a priority selection identifying a priority of cells to service. In response to the priority selection of cell priority counter 322, priority selector 324 determines the priority of cells to be searched.

FIG. 4 is a data flow diagram of camQ 300 servicing connection requests for cells of the same priority, in accordance with one embodiment of the present invention. Once the priority selection is determined, priority selector 324 transmits priority selection 402 to PDCam 312. PDCam 312 is then searched for cells having a priority equal to priority selection 402. In the present example, three cells are determined to have having a priority equal to priority selection 402.

Cells having the selected priority transmit a connection request 404 to grant generator 410. As shown, three connection requests 404 are received at grant generator 410. It should be appreciated that any number of connection requests 404 can be received at grant generator 410, and that the present invention is not meant to be limited to the present embodiment. Provided that each of the connection requests has a distinct destination, grant generator 410 grants a single request 406. In one embodiment, request 406 is randomly determined.

In one embodiment, when all cells having a priority equal to the priority selection have been granted a connection to the merged output queue, cell priority counter 322 changes the priority selection. In one embodiment, cell priority counter 322 decreases the priority selection. In one embodiment, cell priority counter 322 changes the priority selection in response to notification 408 as generated by grant generator 410. Notification 408 indicates that all cells having a priority equal to the priority selection have been granted a connection to the merged output queue.

FIG. 5 is a data flow diagram of a camQ 300 comparing age tags of cells having the same priority and destination, in accordance with one embodiment of the present invention. As described above, a portion of cells having a priority equal to the priority selection is selected. Provided that each of the connection requests has a distinct destination, as described in FIG. 4, a single connection request is granted. In one embodiment, only one connection can be granted per destination. Therefore, provided that a plurality of cells from the portion also have the same destination, an age tag comparison is performed.

As shown in FIG. 5, three cells have a priority equal to the priority selection and have the same destination (e.g., output port). An age tag comparison 502 is performed for the three cells, wherein the connection request for the cell that has the oldest relative age is transmitted to the grant generator (e.g., grant generator 410 of FIG. 4). The oldest cell 504 is selected for transmitting the payload to its corresponding destination.

With reference to FIG. 5, once the connection request is granted and selected as an oldest cell, the cell is forwarded to merged output queue 530 via crossbar 520. In one embodiment, PDCam 312 forwards the priority and destination (e.g., header 302 of FIG. 3) to merged output queue 530 and payload SRAM 314 forwards the payload (e.g., payload 304 of FIG. 3) to merged output queue 530.

In one embodiment, merged output queue 530 operates in a similar manner to camQ 300. However, merged output queue 530 does not comprise a grant generator. Merged output queue 530 comprises payload SRAM, PDCam, and an age comparator. Upon receipt of a cell, in one embodiment, the cell is assigned a second age tag. In another embodiment, the second age tag is the age tag from the input merged queue (e.g., the age tag assigned by age comparator 310 of FIG. 3).

In one embodiment, a priority selector of merged output queue 530 makes a second priority selection. A second portion of cells having a priority equal to the second priority selection is selected. Provided each cell of the second portion have a distinct destination (e.g., an output port), each cell is transmitted to its associated destination. Alternatively, provided a plurality of cells of the second portion have the same destination, the cell with the oldest relative age according to the cell age tags is transmitted to its associated destination.

In another embodiment, merged output queue 530 forwards the cells according to FIFO. In one embodiment, cells are assigned a second age tag upon receipt at merged output queue 530. Cells are then forwarded to their respective destinations based solely on their age tags.

FIGS. 6A and 6B are a flowchart illustrating steps in a process 600 for switching data at a merged input queue of a data switch, in accordance with one embodiment of the present invention. In one embodiment, process 600 is performed on an analog circuit. Although specific steps are disclosed in process 600, such steps are exemplary. That is, the embodiments of the present invention are well suited to performing various other steps or variations of the steps recited in FIGS. 6A and 6B.

At step 605 of FIG. 6A, a plurality of cells are received at a merged input queue (e.g., camQ 300 of FIG. 3) of a data switch (e.g., quadrant 100 of FIG. 1). In one embodiment, the priority and destination are stored in a content addressable memory (e.g., PDCam 312 of FIG. 3) and the payload of the cell is stored in a payload memory (e.g., payload SRAM 314 of FIG. 3).

At step 610, an age tag is assigned to each incoming cell. For purposes of simplification, FIGS. 6A and 6B assume that each cell has been assigned an age tag. In one embodiment, the age tag is assigned by an age tag comparator (e.g., age tag comparator 310 of FIG. 3) of the data switch.

At step 615, a portion of the plurality of cells in the merged input queue are selected according to a priority selection. In one embodiment, the priority selection is made by a priority selector (e.g., priority selector 324 of FIG. 3). The content addressable memory is searched for cells having the same priority as the priority selection.

At step 620, it is determined whether any of the cells of the portion have the same destination. Provided a plurality of cells of the portion have the same destination, as shown at step 625, one cell of the cells having the same destination is selected according to the age tag. In one embodiment, the cell that is the oldest relative to others cells having the same destination is selected. Alternatively, provided all cells of the portion have a distinct destination, process 600 proceeds to step 630. In one embodiment, the age tag comparison can be made after the receiving of a grant. As such, the connection requests not granted are not required to go the age tag comparison, reducing overall power consumption.

At step 630, connection requests for the selected cells are forwarded to a grant generator (e.g., grant generator 410 of FIG. 4). With reference to FIG. 6B, at step 635, the grant generator grants the connection request for one cell. In one embodiment, the grant generator randomly grants the connection request for one cell. Even if the grant generator makes only one grant signal per each destination, the PDCam (e.g., 312 at FIG. 4) can receive more than one connection grant because it sends connection requests to multiple destinations by plurality of cells with same priority. In the present embodiment, the grant from the destination port, which has the least recent cell receiving history, is taken.

At step 640, the cell associated with the granted and selected connection request is transmitted to the merged output queue (e.g., merged output queue 530 of FIG. 5) of the data switch. Process 700 of FIGS. 7A and 7B and process 800 of FIG. 8 below detail various embodiments for switching data at the merged output queue. At step 645, a vacancy is generated in the merged input queue for receiving a new cell. In one embodiment, the vacancy is generated according to a vacant address generator (e.g., vacant address generator 320 of FIG. 3).

At step 650, it is determined whether there are more cells remaining in the portion. Provided there are cell remaining in the portion, process 600 proceeds to step 620. Alternatively, provided there are no cells remaining in the portion, the priority selection is changed, as shown at step 655. Process 600 then proceeds to step 615.

FIGS. 7A and 7B are a flowchart illustrating steps in a process 700 for switching data at a merged output queue of a data switch, in accordance with one embodiment of the present invention. In one embodiment, process 700 is performed on an analog circuit. Although specific steps are disclosed in process 700, such steps are exemplary. That is, the embodiments of the present invention are well suited to performing various other steps or variations of the steps recited in FIGS. 7A and 7B.

At step 705 of process 700, a second plurality of cells are received at a merged output queue (e.g., merged output queue 530 of FIG. 5) of a data switch (e.g., quadrant 100 of FIG. 1). In one embodiment, the priority and destination are stored in a content addressable memory of the merged output queue and the payload of the cell is stored in a payload memory of the merged output queue.

At step 710, a second age tag is assigned to each incoming cell. It should be appreciated that step 710 is optional, and that the age tag for a cell is the age tag as assigned at step 610 of FIG. 6A. In one embodiment, the second age tag is assigned by an age tag comparator of the data switch.

At step 715, a second portion of the second plurality of cells in the merged output queue is selected according to a second priority selection. In one embodiment, the second priority selection is made by a priority. The content addressable memory is searched for cells having the same priority as the second priority selection.

At step 720, it is determined whether any of the cells of the second portion have the same destination. In one embodiment, provided a plurality of cells of the second portion have the same destination, as shown at step 725, one cell of the cells having the same destination is selected according to the second age tag. In another embodiment, as described above at step 710, one cell of the cells having the same destination is selected according to the age tag as assigned at step 610 of FIG. 6A. Alternatively, provided all cells of the portion have a distinct destination, process 700 proceeds to step 730.

At step 730, the cells are transmitted to their destination (e.g., output port). At step 735, a vacancy is generated in the merged output queue for receiving a new cell. In one embodiment, the vacancy is generated according to a vacant address generator.

At step 740, it is determined whether there are more cells remaining in the second portion. Provided there are cell remaining in the second portion, process 700 proceeds to step 720. Alternatively, provided there are no cells remaining in the second portion, the priority selection is changed, as shown at step 745. Process 700 then proceeds to step 715.

FIG. 8 is a flowchart illustrating steps in a process for switching data at a merged output queue of a data switch according to FIFO, in accordance with another embodiment of the present invention. In one embodiment, process 800 is performed on an analog circuit. Although specific steps are disclosed in process 800, such steps are exemplary. That is, the embodiments of the present invention are well suited to performing various other steps or variations of the steps recited in FIG. 8.

At step 805 of process 800, a second plurality of cells are received at a merged output queue (e.g., merged output queue 530 of FIG. 5) of a data switch (e.g., quadrant 100 of FIG. 1). In one embodiment, destination is stored in a content addressable memory of the merged output queue and the payload of the cell is stored in a payload memory of the merged output queue.

At step 810, a second age tag is assigned to each incoming cell. It should be appreciated that step 810 is optional, and that the age tag for a cell is the age tag as assigned at step 610 of FIG. 6A. In one embodiment, the second age tag is assigned by an age tag comparator of the data switch.

At step 815, it is determined whether any of the cells of the second portion have the same destination. In one embodiment, provided a plurality of cells of the second portion have the same destination, as shown at step 820, one cell of the cells having the same destination is selected according to the second age tag. In another embodiment, as described above at step 810, one cell of the cells having the same destination is selected according to the age tag as assigned at step 610 of FIG. 6A. Alternatively, provided all cells of the portion have a distinct destination, process 800 proceeds to step 825.

At step 825, the cells are transmitted to their destination (e.g., an output port). At step 830, a vacancy is generated in the merged output queue for receiving a new cell. In one embodiment, the vacancy is generated according to a vacant address generator. Process 800 then proceeds to step 815.

Content Addressable Merged Queue (CamQ) Architecture

FIG. 9 depicts a block diagram of a content addressable merged queue (camQ) architecture 900 upon which a method for switching data at a merged queue (e.g., process 600 of FIG. 6) may be implemented. In one embodiment, camQ 900 is implemented at iCAM 123 and eCAM 129 of FIG. 1. In one embodiment, camQ900 comprises an array 950 of priority content addressable merged (CAM) cells for storing the priority of incoming cells and an array 960 of destination CAM cells 920 for storing the destination of incoming cells. In one embodiment, array 950 comprises thirty-two five bit priority CAM cells and array 960 comprises thirty-two five-bit destination CAM cells 920.

In one embodiment, camQ 900 is operable to generate a Request 911 and age comparison enable signals AgeCompEn 912 based on the inputs of Enable lines 914 and grant 915. When a priority for the connection request is decided, the priority value 916 is provided to array 950. Array 950 is made by regular CAM structure providing signals Enable lines 914. If there are multiple cells with the provided priority value 916, multiples of signals Enable can be activated. In other words, priority CAM cells 920 that have priority value 916 are activated, thereby activating the corresponding Enable lines 914.

Array 960 comprises one-hot coded destination values at each of the bits of destination CAM cell 920 at each entry 930. For example, if entry j has a destination to out port k, only the kth bit of destination CAM cell 920 at entry j 930 has a value of '1'; the other bits have a value of '0' where $0 \leq (j, k) \leq 31$.

Assuming entry 1, m, and n have enabled and the cell in entry 1 has a destination of p and cell in m and n have destination q, each signal Enable [1], Enable [m] and Enable [n] signal generate Request [p] and Request [q] by the structure of the destination CAM cell. The activated request lines go to corresponding grant generators, and in one embodiment, only one grant signal will be activated. Assuming for instance that Grant [q] was activated, in the present embodiment either cell m or cell n can depart to destination q; not both at the same time. Thus, corresponding age comparison enable signals AgeCompEn [m] and AgeCompEn are activated, e.g., by AND gate 940. An age comparator (e.g., age comparators 107 and 109 of FIG. 1) selects which entry m or n can depart. In one embodiment, $0 \leq (m, n, p, q) \leq 31$.

FIGS. 10A and 10B provide an exemplary circuit diagram of camQ architecture 1000, in accordance with one embodiment of the present invention. CamQ architecture 1000 comprises priority CAM cell array 1010 of FIG. 10A (e.g., array 950 of FIG. 9), destination CAM cell array 1020 of FIG. 10A (e.g. array 960 of FIG. 9), and grant generator 1040 of FIG. 10B (e.g., Binary Round Robin Tree Structure (BRRT) 2000 of FIG. 12B). Priority 1030 of FIG. 10B is received for activating enable lines corresponding to cells of priority CAM cell array 1010. In one embodiment, camQ architecture 1000 further comprises distributed OR gate 1050 of FIG. 10B.

Destination CAM array 960 of FIG. 9 is depicted in somewhat greater detail in FIG. 11. One-hot coded cell destinations are written by WL 970. During cell writing, the one-hot destination values are provided by signals 980 Grant and /Grant. Signal/Match 982 can be activated if transistor array 981 contains a value of '1' and signals Grant and /Grant are '1' and '0' with respect to each other. Age comparison enable signal AgeCompEn [n] 943 goes active if signals /Match [n] and Enable [n] are '0' and '1' with respect to each other by AND gate [n] 949. Request 945 contains a value of '1' if signals /Match[n] and Enable[n] are '1' and '1', respectively.

With reference to FIG. 9, Requests 911 are transmitted to a grant generator (e.g., grant generator 1040 of FIG. 10B). The grant generator transmits grants 915 to cells that are selected for transmission. In one embodiment, the grant generator is a BRRT structure. Where the grant generator is for the input queue, the grant generator may be referred to as an input-side BRRT (iBRRT), and where the grant generator is for the output queue, the grant generator may be referred to as an egress BRRT (eBRRT).

Quadrature Based Random Grant Generator

Exemplary Basic BRRT Cell and BRRT Structure

Exemplary Basic BRRT Cell

FIG. 12A depicts a BRRT cell 1900 in accordance with an embodiment of the present invention. BRRT cell 1900 can be combined with others to comprise a binary round robin tree (BRRT) cell structure which can be programmed for switching service grant selection to achieve urgency based weighted round robin (UWRR) flow control, according to one embodiment of the present invention.

A signal 'Sig[i, l]' represents the i-th signal at a level l. A first service request signal 'Req[i, l]' is received at inputs of 'OR' gate 1905, 'AND' gate 1903, and 'AND' gate 1902. A second service request signal 'Req[i+1, l]' is received at inputs of 'OR' gate 1905, 'AND' gate 1904, and 'AND' gate 1901. 'OR' gate 1905 combines request signals 'Req[i, l]' and 'Req[i+1, l]' to generate a request 'Req[i, l+1]'.

A grant request signal 'Gnt[i, l+1]' is received by 'AND' gates 1903 and 1904. 'AND' gate 1901 receives an uninverted control signal 'Cntr[l]' as a second input. 'AND' gate 1902 receives an inverted (e.g., symbolized herein by '~') control signal '~Cntr[l] as a second input. The outputs of 'AND' gates 1901 and 1902 are inverted and provided as inputs to 'AND' gates 1903 and 1904, respectively. In response to their various inputs, 'AND' gates 1903 and 1904 generate service grant signals 'Grnt[i, l]' and 'Grnt[i+1, l]', respectively, according to the following signal combinations:

$$Gnt[i,l]=Req[i,l]*Grnt[i,l+1]*\sim(Req[i+1,l]*Cntr[l]);$$
and $$Grnt[i+1,l]=Req[i+1,l]*Grnt[i,l+1]*\sim(Req[i,l]*\sim Cntr[l]).$$

Exemplary BRRT Structure

FIG. 12B depicts a BRRT structure 2000, in accordance with an embodiment of the present invention, wherein a number of BRRT cells (e.g., BRRT cell 1900 of FIG. 12A), including BRRT cells with 'Enable' signals (e.g., BRRT cells with 'Enable' 1903.22 of FIG. 12A) are combined in one embodiment to achieve a preference programmable first-one detector service granting functionality. Requests for service 'Rqst[0]' through 'Rqst[3] are received by BRRT cells with 'Enable' signals 1900.0-1900.3, respectively. BRRT cells 1900.0-1900.3 serve as BRRT-Enable cells.

Outputs of BRRT cells with 'Enable' signals 1900.0 and 1900.1 become inputs to BRRT cell 1900.4. Outputs of BRRT cells with 'Enable' signals 1900.2 and 1900.3 become inputs to BRRT cell 1900.5. Outputs of BRRT cells 1900.4 and 1900.5 become inputs to BRRT cell 1900.6, which generates a 'There_is_rqst' signal as an output.

Preference pointer 488 provides control signals (e.g., control signal 'Cntr[l] of FIG. 12A) to each of BRRT cells 1900.0-1900.6. Preference pointer 488 thus controls the switching selection sequence '(Seq ^ PrefPtr)' according to Table 3, below. It is appreciated that the preference pointer can give a selection preference on the grant output signal.

TABLE 3

| Preference Pointer | Selection Sequence '(Seq (0 -> 1 -> 2 -> 3 -> 4 -> 5 -> 6 -> 7)^PrefPtr)' |
|---|---|
| 0 (000) | 0 -> 1 -> 2 -> 3 -> 4 -> 5 -> 6 -> 7 |
| 1 (001) | 1 -> 0 -> 3 -> 2 -> 5 -> 4 -> 7 -> 6 |
| 2 (010) | 2 -> 3 -> 0 -> 1 -> 6 -> 7 -> 4 -> 5 |
| 3 (011) | 3 -> 2 -> 1 -> 0 -> 7 -> 6 -> 5 -> 4 |
| . | . |
| . | . |
| . | . |
| 7 (111) | 7 -> 6 -> 5 -> 4 -> 3 -> 2 -> 1 -> 0 |

With reference to FIG. 12C, a block diagram of an exemplary BRRT structure 2000 in accordance with an embodiment of the present invention is shown. It is seen that a LSB level '2' enters each of BRRT cells 1900.0 through 1900.3. BRRT cells 1900.0 and 1900.1 then provide a LSB level '1' to BRRT cell 1900.4. In a similar fashion, BRRT cells 1900.2 and 1900.3 then provide a LSB level '1' to BRRT cell 1900.5. BRRT cells 1900.4 and 1900.5 then provide a LSB level '0' to BRRT cell 1900.6. Detail 'A' of FIG. 20B shows that BRRT cell 1900.6 then provides a '1' output for a level '0' LSB input containing any '1'; its output would be a '0' only for a level '0' LSB input of all '0' values. In one embodiment, pseudo random grant signal generation is effectuated by a simple ripple counter of reversed bit order, which can serve (e.g., function as) the preference pointer.

With reference to FIG. 12D, a cubical count value field 2050 generated by BRRT 2000 is shown, in accordance with an embodiment of the present invention. Cubical count value field 2050 generated by BRRT 2000 has binary values '000' through '111' at each of is vertices. These count values serve in one embodiment as tie-breakers for determining egress priority. The digit in the lowest value place is counted first. The digit in the second value place is counted second. The digit in the highest value place is counted last. Each counting priority specifies a switching pathway, in the crossbar switch (e.g., crossbar switch 100 of FIG. 1) upon which BRRT 2000 is deployed, that is the preferred pathway. Counting order is maintained by counting along the ordinal axes of field 2050 (e.g., counting is performed along the present axis first, before progressing).

BRRT structure 2000 thus provides fast one-hot selection featuring a 0(Log 2(n)) process. Advantageously, this 0(Log 2 (n)) process achieves programmable preference, which is more difficult to achieve with architectures using conventional 0(n) algorithms. BRRT structure 2000 allows implementation of random selection by counter, in one embodiment by bit reversal. BRRT structure 2000 can be used in a grant generator (e.g., grant generator 129 of FIG. 1 or grant generator 1040 of FIG. 10B) and for 'Write address' signal generation with a one-hot vacancy vector.

Exemplary Ingress BRRT Structure

Another Exemplary Basic BRRT Cell

FIG. 13 depicts another exemplary basic cell 1900.21, according to one embodiment of the present invention. A signal 'Sig[i, l]' again represents the i-th signal at a level l. A first service request signal 'Req[i, l]' is received at inputs of 'OR' gate 1905.21, 'AND' gate 1903, and 'AND' gate 1902.21. A second service request signal 'Req[i+1, l]' is received at inputs of 'OR' gate 1905.21, 'AND' gate 1904.21, and 'AND' gate 1901.21. 'OR' gate 1905 combines request signals 'Req[i, l]' and 'Req[i+1, l]' to generate a request 'Req[i, l+1]'.

A grant request signal 'Gnt[i, l+1]' is received by 'AND' gates 1903.21 and 1904.21. 'AND' gate 1902.21 receives an uninverted control signal 'Cntr[l]' as a second input. 'AND' gate 1901.21 receives an inverted (e.g., symbolized herein by '~') control signal '~Cntr[l]' as a second input. The outputs of 'AND' gates 1901.21 and 1902.21 are inverted and provided as inputs to 'AND' gates 1903.21 and 1904.21, respectively. In response to their various inputs, 'AND' gates 1903.21 and 1904.21 generate service grant signals 'Grnt[i,l]' and 'Grnt[i+1, l]', respectively, according to the following signal combinations:

$$Gnt[i,l]=Req[i,l]*Grnt[i,l+1]*\sim(Req[i+1,l]*\sim Cntr[l]); \text{ and}$$

$$Grnt[i+1,l]=Req[i+1,l]*Grnt[i,l+1]*\sim(Req[i,l]*Cntr[l]).$$

Exemplary BRRT Cell with 'Enable'

FIG. 14 depicts a basic cell 1900.22 with 'Enable' signal (e.g., BRRT), according to one embodiment of the present invention. A grant enable signal 'GrntEnb' is received as a fourth input to 'AND' gates 1903.22 and 1904.22. A first service request signal 'Req[i, l]' is received at inputs of 'OR' gate 1905.22, 'AND' gate 1903.22, and 'AND' gate 1902.22. A second service request signal 'Req[i+1, 1]' is received at inputs of 'OR' gate 1905.22, 'AND' gate 1904.22, and 'AND' gate 1901.22. 'OR' gate 1905.22 combines request signals 'Req[i, l' and 'Req[i+1, l]' to generate a request 'Req[i, l+1].

A grant request signal 'Gnt[i, l+1]' is received by 'AND' gates 1903.22 and 1904.22. 'AND' gate 1901.22 receives an inverted (e.g., symbolized herein by '~') control signal '~Cntr[l]' as a second input. 'AND' gate 1902.22 receives an uninverted control signal 'Cntr[l]' as a second input. The outputs of 'AND' gates 1901.22 and 1902.22 are inverted and provided as inputs to 'AND' gates 1903.22 and 1904.22, respectively. In response to their various inputs, 'AND' gates 1903.22 and 1904.22 generate service grant signals 'Grnt[i, l]' and 'Grnt[i+1, l]', respectively, according to the following signal combinations:

$$Gnt[i,l]=GrntEnb*(Req[i,l]*Grnt[i,l+1]*\sim(Req[i+1,l]\\ *\sim Cntr[l])); \text{ and}$$

$$Grnt[i+1,l]=GrntEnb*(Req[i+1,l]*Grnt[i,l+1]*\sim(Req\\ [i,l]*Cntr[l]).$$

Exemplary BRRT Cell with Single Grant

FIG. 15 depicts a BRRT cell 1900.23 with a single grant signal 'Grnt[i, l+1]', according to one embodiment of the present invention. A first service request signal 'Req[i, l]' is received at inputs of 'OR' gate 1905.23 and 'AND' gate 1902.23. A second service request signal 'Req[i+1, l]' is received at inputs of 'OR' gate 1905.22 and 'AND' gate 1904.23. 'OR' gate 1905.23 combines request signals 'Req [i, l]' and 'Req[i+1, l]' to generate a request 'Req[i, l+1].

A grant request signal 'Gnt[i, l+1]' is received by 'AND' gate 1904.23. 'AND' gate 1902.23 receives an uninverted control signal 'Cntr[l]' as a second input. The outputs of 'AND' gate 1902.23 is inverted and provided as an input to 'AND' gate 1904.23. In response to its various inputs, 'AND' gate 1904.23 generates a service grant signal 'Grnt [i+1, l]' according to the signal combination:

$$Grnt[i+1,l]=(Req[i+1,l]*Grnt[i,l+1]*\sim(Req[i,l]*Cntr\\ [l]).$$

Multiple Latches with One Output

With reference to FIG. 10B, camQ architecture 1000 comprises distributed OR gate 1050. Distributed OR gate 1050 of FIG. 10B comprises a plurality of OR gates (e.g., OR gate 1600 of FIG. 16. If a request associated with a particular input port is granted, the data needs to be transmitted to the corresponding destination. In order to ensure that only one cell is transmitted to a particular destination, distributed OR gate 1050 comprises one OR gate (e.g., a latch) per input queue.

Once a particular destination grants a request to a particular input queue, the associated OR gate goes to high, such that no other input queue can be granted a request for the particular destination. By implementing a distributed OR gate, it is possible to substantially decrease the number of connections used by conventional OR gates, thereby reducing the size and cost of a crossbar switch platform deploying a camQ architecture.

A content addressable merged queue (camQ) architecture for switching data is described herein. Embodiments of the present invention provide for high-speed switch fabric solutions that reduces the memory requirement for input and output queues for crossbar switches significantly by the use of special content addressable memory cells and age tag comparators, implemented within a single chip. In one embodiment, camQ behaves functionally like VOQ FIFO for each supporting priority. Thus, camQ eliminates HOL blocking. In one embodiment, camQ also embraces a scheduler and crossbar within the chip, supporting TDM traffic and multicast traffic also. In one embodiment, structure is independent of the number of support priorities. In one embodiment, many QoS levels are provided, while remaining cost effective at higher traffic bandwidth limits. Data cell age and priority are interleaved criteria in one embodiment for scheduling servicing of the data cells.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the Claims appended hereto and their equivalents.

What is claimed is:

1. A merged queue circuit comprising:
   a first array of priority cells for indicating a priority of a plurality of cells;
   a second array of destination cells for indicating a destination of said plurality of cells;
   a priority selector for selecting a portion of said plurality of cells according to a priority selection; and
   a grant generator for granting at least one connection request associated with cells of said portion.

2. The merged queue circuit of claim 1 wherein said grant generator comprises a binary round robin tree for granting said connection request.

3. The merged queue circuit of claim 1 wherein said first array comprises five-bit priority cells.

4. The merged queue circuit of claim 1 wherein said second array comprises five-bit destination cells.

5. The merged queue circuit of claim 1 further comprising an age selector for generating a connection request associated with a cell of said portion in response to a plurality of cells of said portion having the same said destination.

6. The merged queue circuit of claim 1 further comprising a distributed OR gate for transmitting a cell to said destination.

7. The merged queue circuit of claim 1 wherein said grant generator randomly grants said connection request.

8. A method for switching data at a merged queue, said method comprising:
   receiving a plurality of cells;
   recording a priority value of at least one cell of said plurality of cells at a priority cell array;
   recording a destination value of at least one cell of said plurality of cells at a destination cell array;
   receiving a priority selection for selecting a portion of said plurality of cells; and
   granting at least one connection request associated with cells of said portion.

9. The method of claim 8, where in said granting at least one said connection request is performed according to a binary round robin tree (BRRT).

10. The method of claim 8, where in said granting at least one said connection request is performed randomly.

11. The method of claim 8 wherein said priority cell array comprises five-bit priority cells.

12. The method of claim 8 wherein said destination cell array comprises five-bit destination cells.

13. The method of claim 8 further comprising assigning an age tag to at least one cell of said plurality of cells.

14. The method of claim 13 further comprising generating a connection request associated with a cell of said portion assigned an older age tag in response to a plurality of cells of said portion having the same said destination.

15. The system for switching data at a merged queue, said system comprising:
   means for receiving a plurality of cells;
   means for recording a priority value of at least one cell of said plurality of cells at a priority cell array;
   means for recording a destination value of at least one cell of said plurality of cells at a destination cell array;
   means for receiving a priority selection for selecting a portion of said plurality of cells; and
   means for granting at least one connection request associated with cells of said portion.

16. The system of claim 15, wherein said means for granting at least one said connection request comprises a binary round robin tree (BRRT).

17. The system of claim 15, wherein said means for granting at least one said connection request randomly grants said connection request.

18. The system of claim 15, wherein said priority cell array comprises five-bit priority cells.

19. The system of claim 15, wherein said destination cell array comprises five-bit destination cells.

20. The system of claim 19 further comprising means for assigning an age tag to at least one cell of said plurality of cells.

21. The system of claim 15 further comprising means for generating a connection request associated with a cell of said portion assigned an older age tag response to a plurality of cells of said portion having the same said destination.

22. The system of claim 15 further comprising means for transmitting a cell to said destination.

23. A merged queue comprising:
   an input queue for receiving a plurality of cells;
   a first array of priority cells for indicating a priority of at least one cell of a plurality of cells, wherein a portion of said plurality of cells is selected according to a priority selections; and
   a second array of destination cells for indicating a destination of at least one cells of said plurality of cells, wherein a connection request is generated based on a destination of cells of said portion.

24. The merged queue of claim 23 wherein at least one connection request is granted according to a binary round robin tree.

25. The merged queue of claim 23 wherein at least one connection request is granted randomly.

26. The merged queue of claim 23 wherein said first array comprises five-bit priority cells.

27. The merged queue of claim 23 wherein said second array comprises five-bit destination cells.

28. The merged queue of claim 23 wherein, provided at least two cells of said portion have the same said destination, a connection request associated with an older cell of said cells having the same said destination is generated.

29. The merged queue of claim 23 wherein a cell is transmitted to said destination according to a distributed OR gate.

* * * * *